(12) United States Patent
Curtin et al.

(10) Patent No.: US 11,032,416 B2
(45) Date of Patent: Jun. 8, 2021

(54) INTELLIGENT SPEECH-ENABLED SCRIPTING

(71) Applicant: American TEL-A-Systems, Inc., McFarland, WI (US)

(72) Inventors: Thomas V. Curtin, Madison, WI (US); Alena L. Aiken, Monona, WI (US); Kevin Mark Beale, Stoughton, WI (US); Wayne Paul Waldner, Richland Center, WI (US); Daniel R. Cropp, McFarland, WI (US); Alan D. Tucker, Madison, WI (US)

(73) Assignee: American TEL-A Systems, Inc., McFarland,, WI (US)

( * ) Notice: Subject to any disclaimer, the term of this patent is extended or adjusted under 35 U.S.C. 154(b) by 0 days.

(21) Appl. No.: 16/258,341

(22) Filed: Jan. 25, 2019

(65) Prior Publication Data

US 2020/0244803 A1 Jul. 30, 2020

(51) Int. Cl.
| | |
|---|---|
| *H04M 3/42* | (2006.01) |
| *H04M 3/436* | (2006.01) |
| *G10L 13/08* | (2013.01) |
| *G10L 15/22* | (2006.01) |
| *H04M 3/523* | (2006.01) |
| *H04M 3/54* | (2006.01) |

(52) U.S. Cl.
CPC ............ *H04M 3/436* (2013.01); *G10L 13/08* (2013.01); *G10L 15/22* (2013.01); *H04M 3/523* (2013.01); *H04M 3/541* (2013.01)

(58) Field of Classification Search
CPC ......... H04W 4/02; H04W 4/16; H04W 92/02; H04W 76/02; H04W 8/26; H04W 88/06
USPC ....................................... 455/414.1, 417, 445
See application file for complete search history.

(56) References Cited

U.S. PATENT DOCUMENTS

| | | |
|---|---|---|
| 5,444,774 A | 8/1995 | Friedes |
| 7,221,753 B2 | 5/2007 | Hutton et al. |
| 7,471,786 B2 | 12/2008 | Erhart et al. |
| 7,689,426 B2 | 3/2010 | Matula |
| 7,920,693 B2 | 4/2011 | Sharpe et al. |
| 8,085,927 B2 | 12/2011 | Erhart et al. |

(Continued)

OTHER PUBLICATIONS

UK Intellectual Property Office, Patents Act 1977: Search Report under Section 17(5) for International Application GB1915766.8 dated Apr. 28, 2020.

*Primary Examiner* — Temica M Beamer
(74) *Attorney, Agent, or Firm* — Baker Botts L.L.P.

(57) ABSTRACT

A system comprises an applications server configured to communicatively couple to a softswitch, a resource server, and a database. The applications server is configured to receive, from the softswitch, an indication that a call from a calling party directed to a called number was received and determine, in response to the indication that the call was received, whether to route the call to an available agent or to a speech-enabled intelligent script associated with one of the called number or the calling party. The applications server is configured to instruct the softswitch to route the call to the speech-enabled intelligent script in response to a determination to route the call to the speech-enabled intelligent script. The applications server is configured to instruct the softswitch to route the call to the available agent in response to a determination to route the call to the available agent.

19 Claims, 6 Drawing Sheets

(56) References Cited

U.S. PATENT DOCUMENTS

| | | |
|---|---|---|
| 8,116,445 B2 | 2/2012 | Odinak et al. |
| 8,135,126 B2 | 3/2012 | Shafiee et al. |
| 8,462,935 B2 | 6/2013 | Odinak et al. |
| 8,744,062 B2 | 6/2014 | Pickford |
| 8,831,204 B1 | 9/2014 | Pycko et al. |
| 9,112,971 B2 | 8/2015 | Munns et al. |
| 9,225,835 B2 | 12/2015 | Pickford |
| 9,307,084 B1 | 4/2016 | Pycko et al. |
| 9,680,998 B2 | 6/2017 | Pickford |
| 10,044,860 B2 | 8/2018 | Odinak et al. |
| 2003/0212558 A1 | 11/2003 | Matula |
| 2006/0062373 A1 | 3/2006 | Chervets et al. |
| 2006/0062376 A1 | 3/2006 | Pickford |
| 2007/0036332 A1 | 2/2007 | Busayapongchai |
| 2011/0081007 A1* | 4/2011 | Bar-Yoav ............... H04L 51/24 379/88.13 |
| 2015/0281446 A1* | 10/2015 | Milstein ............. H04M 3/5166 379/88.01 |
| 2015/0358465 A1 | 12/2015 | Munns et al. |
| 2017/0084272 A1* | 3/2017 | Flaks .................... G10L 15/193 |
| 2018/0152560 A1* | 5/2018 | Kumar ............... H04M 3/5232 |

* cited by examiner

INTELLIGENT SPEECH-ENABLED SCRIPTING

TECHNICAL FIELD

The present disclosure relates, in general, to the field of information collection systems and more particularly to a system and method for intelligent speech-enabled scripting.

BACKGROUND

Call centers are designed to connect callers to agents or other company representatives for a variety of purposes. Systems have been developed to facilitate the handling of incoming calls to a call center. These systems, however, suffer from significant deficiencies. As one example, existing systems are complex and not well integrated. These systems typically require multiple, separate appliances, each of which provides a separate functionality. For example, a call center may be required to deploy one appliance to facilitate an interactive voice response (IVR) system, another device to coordinate and control agent-based call handling, and still other devices to provide other functionalities to the call center. Configuring this assortment of devices to work effectively together is challenging. Thus, there is need for an improved system that alleviates the complexity and burdens associated with employing a disparate assortment of devices.

As another example, existing systems fail to adequately address a key issue facing call centers; namely, the variation in call loads over time. The amount of traffic directed to a call center ebbs and flows. During non-peak times, the number of incoming calls may be relatively stable. At peak times, however, the number of incoming calls may increase dramatically. While existing systems may be able to effectively handle calls received during non-peak times, their efficacy diminishes as the load on the call center increases. When the load on the system exceeds capacity, existing systems may place incoming calls in a queue, where they are dealt with only after an uncertain (and often unacceptably long) period of time has passed. Thus, there is a further need for an improved system of managing call loads at a call center.

As still another example, existing systems fail to provide adequate security measures to ensure that sensitive information conveyed during a call is safeguarded. The failure to adequately protect sensitive information makes these systems attractive targets for malicious actors that may attempt to gain access to the sensitive information, and potentially exposes the call center operator to liability. Additionally, existing systems often make sensitive data available to an agent, which creates another potential security risk. Thus, there is a further need for an improved system that reduces or eliminates these security risks.

SUMMARY

To address the foregoing problems with existing approaches, disclosed is a system. The system comprises an applications server configured to communicatively couple to a softswitch, a resource server comprising a speech-recognition engine, and a database. The applications server is configured to receive, from the softswitch, an indication that a call from a calling party directed to a called number was received. The applications server is configured to determine, in response to the indication that the call was received, whether to route the call to an available agent or to a speech-enabled intelligent script associated with one of the called number or the calling party. The applications server is configured to instruct the softswitch to route the call to the speech-enabled intelligent script in response to a determination to route the call to the speech-enabled intelligent script, the speech-enabled intelligent script configured to guide a user on the call through the speech-enabled intelligent script using one or more of pre-recorded prompts, voice menus, and text-to-speech prompts. The applications server is configured to instruct the softswitch to route the call to the available agent in response to a determination to route the call to the available agent.

In certain embodiments, the applications server may be configured to determine whether to route the call to the available agent or to the speech-enabled intelligent script based on whether an agent is available to answer the call. The applications server may be configured to instruct the softswitch to route the call to the speech-enabled intelligent script in response to a determination that the agent is not available to answer the call. The applications server may be configured to instruct the softswitch to route the call to the available agent in response to a determination that the agent is available to answer the call.

In certain embodiments, the applications server may be configured to obtain, using the speech recognition engine of the resource server, one or more of selections and data inputs from the user in response to the one or more of pre-recorded prompts, voice menus, and text-to-speech prompts of the speech-enabled intelligent script. The applications server may be configured to monitor a progress of the user through the speech-enabled intelligent script.

In certain embodiments, the applications server may be configured to obtain information associated with the user from the database. The applications server may be configured to dynamically generate at least one text-to-speech prompt of the speech-enabled intelligent script based on the obtained information associated with the user. The applications server may be configured to obtain at least one of the one or more of selections and data inputs from the user in response to the dynamically generated at least one text-to-speech prompt.

In certain embodiments, the applications server may be configured to store the obtained one or more selections and data inputs from the user in the database.

In certain embodiments, the applications server may be configured to monitor an availability of one or more agents while the user is interacting with the speech-enabled intelligent script. The applications server may be configured to determine that an agent is now available to answer the call. The applications server may be configured to instruct the softswitch to transfer the call to the agent that is now available to answer the call. The applications server may be configured to send the one or more of selections and data inputs obtained from the user and an indication of the progress of the user through the speech-enabled intelligent script to the agent that is now available to answer the call.

In certain embodiments, the applications server may be configured to communicatively couple to a graphical user interface. The applications server may be configured to display, on the graphical user interface, a visual representation of the speech-enabled intelligent script and an indication of the progress of the user through the speech enabled script. In certain embodiments, the applications server may be configured to determine, based on the one or more selections and data inputs obtained from the user, a measurement of user satisfaction. The applications server may be configured to display, on the graphical user interface, a visual indication of the measurement of user satisfaction.

In certain embodiments, the applications server may be configured to determine that the user is to provide protected information. The applications server may be configured to instruct the softswitch to route the call from the available agent to the speech-enabled intelligent script in response to the determination that the user is to provide protected information. In certain embodiments, the applications server may be configured to obtain the protected information from the user in response to the one or more of pre-recorded prompts, voice menus, and text-to-speech prompts of the speech-enabled intelligent script. The applications server may be configured to store the obtained protected information in the database. The applications server may be configured to mask the obtained protected information such that it cannot be viewed by the available agent. The applications server may be configured to instruct the softswitch to route the call from the speech-enabled intelligent script back to the available agent after obtaining the protected information.

In certain embodiments, the applications server may be configured to determine whether to route the call to the available agent or to the speech-enabled intelligent script based on information associated with one or more previous calls made by the user.

Also disclosed is a method. The method comprises receiving an indication that a call from a calling party directed to a called number was received. The method comprises determining, in response to the indication that the call was received, whether to route the call to an available agent or to a speech-enabled intelligent script associated with one of the called number or the calling party. The method comprises routing the call, based on the determination, to either the available agent or the speech-enabled intelligent script, the speech-enabled intelligent script configured to guide a user on the call through the speech-enabled intelligent script using one or more of pre-recorded prompts, voice menus, and text-to-speech prompts.

In certain embodiments, determining whether to route the call to the available agent or to the speech-enabled intelligent script may comprise determining whether an agent is available to answer the call. Routing the call based on the determination may comprise routing the call based on the determination of whether an agent is available to answer the call.

In certain embodiments, the method may comprise routing the call to the speech-enabled intelligent script in response to a determination that the agent is not available to answer the call. The method may comprise obtaining one or more of selections and data inputs from the user in response to the one or more of pre-recorded prompts, voice menus, and text-to-speech prompts of the speech-enabled intelligent script. The method may comprise monitoring a progress of the user through the speech-enabled intelligent script.

In certain embodiments, the method may comprise obtaining information associated with the user from a database. The method may comprise dynamically generating at least one text-to-speech prompt of the speech-enabled intelligent script based on the obtained information associated with the user. In certain embodiments, at least one of the one or more of selections and data inputs from the user may be obtained in response to the dynamically generated at least one text-to-speech prompt.

In certain embodiments, the method may comprise storing the obtained one or more selections and data inputs from the user in a database communicatively coupled to the applications server.

In certain embodiments, the method may comprise monitoring an availability of one or more agents while the user is interacting with the speech-enabled intelligent script. The method may comprise determining that an agent is now available to answer the call. The method may comprise routing the call to an agent that is now available to answer the call. The method may comprise sending the one or more of selections and data inputs obtained from the user and an indication of the progress of the user through the speech-enabled intelligent script to the agent that is now available to answer the call.

In certain embodiments, the method may comprise routing the call to the available agent in response to a determination that the agent is available to answer the call. The method may comprise determining that the user is to provide protected information. The method may comprise routing the call from the available agent to the speech-enabled intelligent script in response to a determination that the user is to provide protected information.

In certain embodiments, the method may comprise obtaining the protected information from the user in response to the one or more of pre-recorded prompts, voice menus, and text-to-speech prompts of the speech-enabled intelligent script. The method may comprise storing the obtained protected information in a database communicatively coupled to the applications server. The method may comprise routing the call from the speech-enabled intelligent script back to the available agent after obtaining the protected information. The method may comprise masking the obtained protected information such that it cannot be viewed by the available agent.

Also disclosed is a method. The method comprises receiving an indication that a call from a calling party directed to a called number was received. The method comprises determining, in response to the indication that the call was received, that an agent is available to answer the call. The method comprises routing the call to the available agent in response to the determination that an agent is available to answer the call. The method comprises determining that the calling party is to provide protected information. The method comprises routing the call from the available agent to a speech-enabled intelligent script associated with the called number in response to the determination that the calling party is to provide protected information, the speech-enabled intelligent script configured to guide the calling party through the speech-enabled intelligent script using one or more of pre-recorded prompts, voice menus, and text-to-speech prompts.

In certain embodiments, the method may comprise obtaining the protected information from the calling party in response to the one or more of pre-recorded prompts, voice menus, and text-to-speech prompts of the speech-enabled intelligent script. The method may comprise routing the call from the speech-enabled intelligent script associated with the called number back to the available agent after obtaining the protected information. The method may comprise masking the obtained protected information such that it cannot be viewed by the available agent.

In certain embodiments, the method may comprise storing information associated with the calling party in a database. The method may comprise dynamically generating at least one text-to-speech prompt of the speech-enabled intelligent script based on the obtained information associated with the calling party.

Certain embodiments of the present disclosure may provide one or more technical advantages. As one example, certain embodiments may advantageously provide a system that alleviates the complexity and burdens associated with employing a disparate assortment of devices. As another example, certain embodiments may advantageously improve call center operation during peak load times by routing calls to speech-enabled intelligent scripts. As still another example, certain embodiments may advantageously reduce or eliminate the security risks associated with existing approaches. Other advantages will be apparent to a person of ordinary skill in the art. Certain embodiments may contain some, none, or all of the above-described technical advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
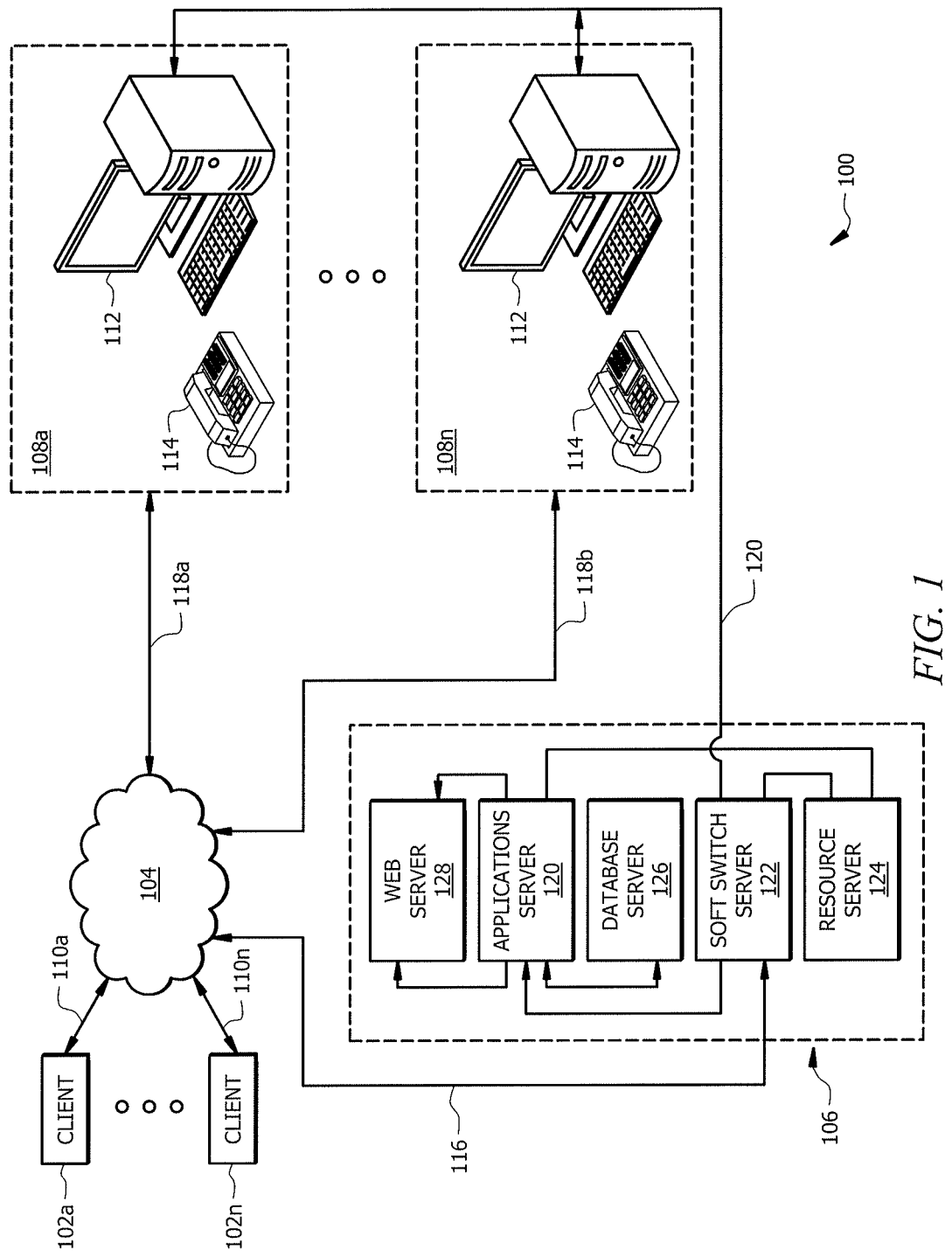
FIG. 1 is a block diagram of an example communication system, in accordance with certain embodiments.

As described above, systems have been developed to facilitate the handling of incoming calls to a call center. These systems, however, suffer from a number of significant deficiencies. First, existing systems are complex and not well integrated, as they typically require multiple, separate appliances, each of which provides a separate functionality. Configuring such a disparate assortment of devices to work effectively together is challenging. Second, existing approaches fail to adequately address the variation in call loads that occur over time at a call center. At peak times, the ability of existing approaches to effectively handle calls diminishes as the load on the call center increases. Finally, existing systems fail to provide adequate security measures to ensure that sensitive information conveyed during a call is safeguarded.

The present disclosure contemplates various embodiments that may address these and other deficiencies associated with existing approaches. According to one example embodiment, a system is disclosed. The system comprises an applications server. The applications server is configured to communicatively couple to a softswitch, a resource server comprising a speech-recognition engine, and a database. The applications server is configured to receive, from the softswitch, an indication that a call from a calling party directed to a called number was received. The applications server is configured to determine, in response to the indication that the call was received, whether to route the call to an available agent or to a speech-enabled intelligent script associated with one of the called number or the calling party. The applications server is configured to instruct the softswitch to route the call to the speech-enabled intelligent script in response to a determination to route the call to the speech-enabled intelligent script. The speech-enabled intelligent script is configured to guide a user on the call through the speech-enabled intelligent script using one or more of pre-recorded prompts, voice menus, and text-to-speech prompts. The applications server is configured to instruct the softswitch to route the call to the available agent in response to a determination to route the call to the available agent.

In certain embodiments, the applications server may be configured to determine whether to route the call to the available agent or to the speech-enabled intelligent script based on whether an agent is available to answer the call. The applications server may be configured to instruct the softswitch to route the call to the speech-enabled intelligent script in response to a determination that the agent is not available to answer the call. The applications server may be configured to instruct the softswitch to route the call to the available agent in response to a determination that the agent is available to answer the call.

In certain embodiments, the applications server may be configured to obtain, using the speech recognition engine of the resource server, one or more of selections and data inputs from the user in response to the one or more of pre-recorded prompts, voice menus, and text-to-speech prompts of the speech-enabled intelligent script. The applications server may be configured to monitor a progress of the user through the speech-enabled intelligent script.

In certain embodiments, the applications server may be configured to obtain information associated with the user from the database. The applications server may be configured to dynamically generate at least one text-to-speech prompt of the speech-enabled intelligent script based on the obtained information associated with the user. The applications server may be configured to obtain at least one of the one or more of selections and data inputs from the user in response to the dynamically generated at least one text-to-speech prompt.

In certain embodiments, the applications server may be configured to monitor an availability of one or more agents while the user is interacting with the speech-enabled intelligent script. The applications server may be configured to determine that an agent is now available to answer the call. The applications server may be configured to instruct the softswitch to transfer the call to the agent that is now available to answer the call. The applications server may be configured to send the one or more of selections and data inputs obtained from the user and an indication of the progress of the user through the speech-enabled intelligent script to the agent that is now available to answer the call.

According to another example embodiment, a method is disclosed. The method comprises receiving an indication that a call from a calling party directed to a called number was received. The method comprises determining, in response to the indication that the call was received, whether to route the call to an available agent or to a speech-enabled intelligent script associated with one of the called number or the calling party. The method comprises routing the call, based on the determination, to either the available agent or the speech-enabled intelligent script, the speech-enabled intelligent script configured to guide a user on the call through the speech-enabled intelligent script using one or more of pre-recorded prompts, voice menus, and text-to-speech prompts.

In certain embodiments, determining whether to route the call to the available agent or to the speech-enabled intelligent script may comprise determining whether an agent is available to answer the call. Routing the call based on the determination may comprise routing the call based on the determination of whether an agent is available to answer the call.

In certain embodiments, the method may comprise routing the call to the speech-enabled intelligent script in response to a determination that the agent is not available to answer the call. The method may comprise obtaining one or more of selections and data inputs from the user in response to the one or more of pre-recorded prompts, voice menus, and text-to-speech prompts of the speech-enabled intelligent script. The method may comprise monitoring a progress of the user through the speech-enabled intelligent script.

In certain embodiments, the method may comprise obtaining information associated with the user from a database. The method may comprise dynamically generating at least one text-to-speech prompt of the speech-enabled intelligent script based on the obtained information associated with the user. In certain embodiments, at least one of the one or more of selections and data inputs from the user may be obtained in response to the dynamically generated at least one text-to-speech prompt.

In certain embodiments, the method may comprise monitoring an availability of one or more agents while the user is interacting with the speech-enabled intelligent script. The method may comprise determining that an agent is now available to answer the call. The method may comprise routing the call to an agent that is now available to answer the call. The method may comprise sending the one or more of selections and data inputs obtained from the user and an indication of the progress of the user through the speech-enabled intelligent script to the agent that is now available to answer the call.

According to another example embodiment, a method is disclosed. The method comprises receiving an indication that a call from a calling party directed to a called number was received. The method comprises determining, in response to the indication that the call was received, that an agent is available to answer the call. The method comprises routing the call to the available agent in response to the determination that an agent is available to answer the call. The method comprises determining that the calling party is to provide protected information. The method comprises routing the call from the available agent to a speech-enabled intelligent script associated with the called number in response to the determination that the calling party is to provide protected information, the speech-enabled intelligent script configured to guide the calling party through the speech-enabled intelligent script using one or more of pre-recorded prompts, voice menus, and text-to-speech prompts.

In certain embodiments, the method may comprise obtaining the protected information from the calling party in response to the one or more of pre-recorded prompts, voice menus, and text-to-speech prompts of the speech-enabled intelligent script. The method may comprise routing the call from the speech-enabled intelligent script associated with the called number back to the available agent after obtaining the protected information. The method may comprise masking the obtained protected information such that it cannot be viewed by the available agent.

In certain embodiments, the method may comprise storing information associated with the calling party in a database. The method may comprise dynamically generating at least one text-to-speech prompt of the speech-enabled intelligent script based on the obtained information associated with the calling party.

Certain embodiments of the present disclosure may provide one or more technical advantages. As one example, certain embodiments may advantageously provide a unified system (e.g., a service platform) that alleviates the complexity and burdens associated with employing a disparate assortment of devices. As another example, certain embodiments may advantageously improve call center operation during peak load times by routing calls to speech-enabled intelligent scripts. As still another example, certain embodiments may advantageously reduce or eliminate the security risks associated with existing approaches. Other advantages will be apparent to a person of ordinary skill in the art. Certain embodiments may contain some, none, or all of the above-described advantages.

FIG. 1 is a block diagram of an example communication system 100, in accordance with certain embodiments. More particularly, FIG. 1 illustrates communication system 100 comprising one or more clients 102a-102n, a service platform 106, and one or more operator stations 108a-108n. Although FIG. 1 illustrates one example of communication system 100, it should be understood that this is for purposes of example only and the present disclosure is not limited to the example communications system of FIG. 1. Rather, the present disclosure contemplates that other embodiments of system 100 may be used without departing from the scope of the present disclosure.

In the example embodiment of FIG. 1, clients 102a-102n are coupled to network 104 through communications link 110. As used throughout this document, the term "couple" and/or "coupled" refers to any direct or indirect communication between two or more elements, whether or not those elements are in physical contact with one another. Each client 102 may include any computing and/or communication device capable of enabling the communication of information to or from one or more of service platform 106 and operator stations 108 over network 104. In some embodiments, clients 102a-102n enable a user of system 100 (e.g., a calling party or a called party) to communicate and/or receive data to and/or from service platform 106 and/or operator stations 108. Each client 102 may include, for example, a telephone, a wireless device, a voice over Internet Protocol (IP) device, a desktop computer, a laptop computer, a personal digital assistant (PDA), a workstation, a mainframe computer, a mini-frame computer, a web server, or any other computing and/or communicating device.

Service platform 106 receives and/or communicates data (e.g., from or to clients 102a-102n and/or operator stations 108) through network 104 coupled to service platform 106. In this example, service platform 106 couples to network 104 through communications link 116. In certain embodiments, service platform 106 operates to collect, store, and/or communicate data to and/or from network 104. Network 104 may comprise any wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. In certain embodiments, service platform 106 may be configured to integrate with, for example, telephone carriers and private branch exchange (PBX) equipment to provide a stand-alone, fully functional call center environment. In some cases, the carrier and PBX integration may be established using a Session Initiation Protocol (SIP) trunk integration method.

Service platform 106 may comprise any suitable combination of hardware, software, and/or firmware. In certain embodiments, service platform 106 may comprise any device or combination of devices that may include one or more software and/or firmware modules. In the example embodiment of FIG. 1, service platform 106 includes an applications server 120, a softswitch server 122, a resource server 124, a database server 126, and a web server 128. Although FIG. 1 illustrates a particular arrangement of elements of service platform 106, it should be understood that the present disclosure is not limited to the precise arrangement of the example embodiment of FIG. 1. For example, although FIG. 1 illustrates an example embodiment in which applications server 120, softswitch server 122, resource server 124, database server 16, and web server 128 are incorporated into a single device, the present disclosure is not limited to this example embodiment. In certain embodiments, the elements of service platform 106 may be distributed. In certain embodiments, service platform 106 may contain fewer components than those illustrated in the example embodiment of FIG. 1. Additionally, in certain embodiments service platform 106 may contain any suitable additional components that may provide one or more of the functionalities described herein and/or additional functionality of service platform 106.

In certain embodiments, one or more of applications server 120, softswitch server 122, resource server 124, database server 126, and web server 128 may run on dedicated servers. In other embodiments, one or more of applications server 120, softswitch server 122, resource server 124, database server 126, and web server 128 may run in a virtual server environment. Running applications server 120, softswitch server 122, resource server 124, database server 126, and web server 128 in a virtual server deployment may advantageously reduce the number of servers needed and provide greater flexibility in terms of redundancy and ease of deployment.

Applications server 120 may house one or more applications used by service platform 106. As one example, in certain embodiments applications server 120 may provide a full suite of call center and enterprise applications. For example, applications server 120 may provide for automated call distribution (ACD), such as skills-based routing ACD. This may advantageously enable service platform 106 to provide for functionality such as priority call routing, overflow, integral voice processing, reporting, and server-based PBX integration. In certain embodiments, applications server 120 may determine how incoming and/or outgoing calls should be routed, and provide instructions to softswitch server 122 to route calls in a particular manner.

As another example, applications server 120 may provide speech-enabled intelligent scripting functionality. An intelligent script guides users through call completion steps, work flow steps, and messaging steps. Intelligent scripts can be built for call center agents, operators, and web and mobile users. Similarly, intelligent scripts guide call center agents through call completion steps. In certain embodiments, an intelligent script presents the appropriate options for each call type an agent handles, eliminating errors and reducing training time. One exemplary use of intelligent scripts is healthcare code calls. Call scripts guide agents through the specific requirements for code calls, eliminating errors, ensuring the codes are completed quickly, and self-documenting all steps taken to complete each code call.

Intelligent scripts may contain any number of elements, actions, and screens. In certain embodiments, a script designer enables an administrator (e.g., a call center administrator) to create any number of intelligent scripts. Each script may have a unique flow to present the elements, actions, and screens in the preferred order for each scenario. Branching and decision trees may be available within the scripts to customize the flow of elements based on selections, date/time, or data. In one particular non-limiting example, a script can comprise a series of queries requesting information and/or data from a user (e.g., a caller) of service platform 106. In some cases, intelligent scripts may include, for example, an HTML-based script, an XML-based script, a JSON-based script, or a combination of these or other scripting formats. Intelligent scripts may comprise, for example, software, firmware, code, portions of code, data compilations, and/or a combination of these or any other type of data.

Speech-enabled intelligent scripts enable users (e.g., a user of a client 102) to interact with intelligent scripts without agent involvement. Phone users are guided through scripts using pre-recorded prompts, voice menus, and text-to-speech menus. Phone users make selections and input data (e.g., using Dual Tone-Multi Frequency (DTMF) entry or speech recognition entry). In certain embodiments, the entire intelligent script may be speech-enabled. In certain embodiments, the script designer may enable the administrator to choose which entries are to be speech-enabled. In certain embodiments, the speech-enabled intelligent script (or a section thereof) may include prompts and/or questions similar to those in the intelligent script provided to the agent had one been available. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on previous call interactions.

As described in more detail below, speech-enabling intelligent scripts creates an opportunity to have a single script that presents speech-enabled input for a portion of the script, and screen-enabled input for another portion of the script. For example, in certain embodiments portions of an intelligent script that prompt a user for protected information may be speech-enabled. This may advantageously improve security of protected information by making that information unavailable to an agent. The logic for choosing which type of entry is appropriate for each portion of the script is contained within the script and may be configurable using the script designer tool. In certain embodiments, the speech-enabled intelligent script and the intelligent script executed by host 112 are generated from a common script stored in a memory accessible to the elements of service platform 106 (e.g., applications server 120) and operator stations 108 (e.g., in database server 126).

As another example, applications server 120 may provide various voice services (alone or in combination with, for example, one or more of softswitch server 122 and resource server 124). For instance, applications server 120 may provide call center functions such as playing greetings to callers with multi-level navigation menus, playing automated call queuing announcements, playing automated agent greetings, automated call recording and playback, and other suitable functions. In certain embodiments, applications server 120 may provide for automated outbound phone calls (e.g., calls to one or more of clients 102) with messages played using integrated text-to-speech.

Other examples of services that service platform 106 provides may include (but are not limited to): call routing; call monitoring; database driven scripted messages (including intelligent speech-enabled scripts described above); call recording; directory services; status, event, on-call, and workforce scheduling tools; and event-driven statistical and analytical reporting for console operators as well as enterprise web users.

It should be appreciated that although certain functions of applications server 120 have been described above (and will be further described in more detail below), these functions are described for purposes of example only. The present disclosure is not limited to the example embodiments described herein. In practice, applications server 120 may provide only a subset of the above-described functions, and in some cases applications server 120 may provide other suitable functionality for service platform 106.

Softswitch server 122 is coupled to applications server 120 and resource server 124. Softswitch server 122 may house the switching components of service platform 106. For example, softswitch server 122 may include a softswitch. In certain embodiments, the softswitch may be a SIP-based telephony switch. The softswitch may receive inbound phone calls (e.g., from clients 102) and send outgoing call requests (e.g., outbound calls from operator stations 108). The softswitch may provide telephony services to, for example, IP subscribers and traditional PSTN subscribers, for example by supplying the trunking between the IP and PSTN networks. Softswitch server 122 may operate in tandem with applications server 120, resource server 124, database server 126, and web server 128 to provide voice processing and switching resources. For example, softswitch server 122 may provide one or more of intelligent call routing, switch-based configurable call control, multi-lingual voice processing resources, and other suitable functionality. In certain embodiments, softswitch 122 may stream audio to resource server 124 for processing (for example, using the speech recognition functionality of resource server 124, described in more detail below).

Resource server 124 is coupled to applications server 120 and softswitch server 122. Resource server 124 may operate in tandem with one or more of applications server 120, softswitch server 122, database server 126, and web server 128 to provide voice processing resources for service platform 106. For example, resource server 124 may provide a speech recognition engine and voice resources for service platform 106. Resource server 124 may include an automatic speech recognition (ASR) engine capable of processing voice responses, natural language processing, text-to-speech translations, and/or speech-to-text translations in connection with one or more voice-enabled functions of service platform 106. In certain embodiments, resource server 124 can be configured to use one or more customizable grammars to match spoken phrases to, for example, directory listings. Resource server 124 may be configured to receive audio from softswitch server 122 for processing using the speech-recognition functionalities described above.

Database server 126 is coupled to applications server 120. Database server 126 may store information utilized by one or more other elements of service platform 106 (such as applications server 120, softswitch server 122, resource server 124, and web server 128). For example, database server 126 may store one or more of speech-enabled intelligent scripts, intelligent scripts, scripts, prompts, information associated with a user (e.g., called or calling party), selections and data inputs from a user, and any other suitable information. In certain embodiments, database 126 may use an SQL server database engine for database management, storage, and retrieval. Database server 126 may include memory capable of storing one or more scripts (speech-enabled intelligent scripts, intelligent scripts, and scripts), data associated with a user's response or responses, information related to previous interactions between a user and service platform 106 and/or a user and an agent, and/or any other suitable information. The memory may include any hardware, software, firmware, or combination thereof operable to store and facilitate retrieval of information. The memory may store information using any of a variety of data structures, arrangements, and/or compilations. The memory may, for example, include a dynamic random access memory (DRAM), a static random access memory (SRAM), a NAND flash memory, or any other suitable volatile or nonvolatile storage and retrieval device or combination of devices.

Data stored in database 126 may be accessible by multiple components of service platform 106 and/or operator stations 108 (including, for example, host 112 described in more detail below). For example, the data stored in database 126 may be accessible to one or more of applications server 120, softswitch server 122, resource server 124, web server 128, and host 112. Storing data in a memory that is accessible to multiple elements of system 100 can prove advantageous when it is desired to subsequently access and process this information. In certain embodiments, data stored in database server 126 can be used to populate a speech-enabled intelligent script, and intelligent script, and/or any other type of script used by applications server 120 and/or an agent associated with an operator station 108. Populating scripts with data stored in database 126 can help the intelligent speech-enabled scripts (or an agent using an intelligent scripts) to interact more efficiently with a user of a client 102. For example, populating a speech-enabled intelligent script and/or a script used by a live agent with data from database 126 allows the intelligent speech-enabled script or the agent or operator to review the responses previously provided, which may allow the agent to better assist the client.

Web server 128 provides the web services for service platform 106. In certain embodiments, service platform 106 may include all or some suitable combination of the servers described above, as well as (alternatively or in addition to) other elements configured to perform desired communicating and/or computing functionality.

Each of applications server 120, softswitch server 122, resource server 124, database server 126, and web server 128 may comprise any suitable combination of hardware, software, and firmware. In certain embodiments, one or more of applications server 120, softswitch server 122, resource server 124, database server 126, and web server 128 may include processing circuitry, such as a combination of one or more of a controller, microprocessor, microcontroller, central processing unit, digital signal processor, application-specific integrated circuit, field programmable gate array, or any other suitable computing device, resource, or combination of hardware, software, and/or encoded logic operable to provide the functionality described herein. The processing circuitry may execute instructions stored in device readable medium or in memory to provide the functionality described herein. Applications server 120, softswitch server 122, resource server 124, database server 126, and web server 128 may comprise any form of volatile or non-volatile computer readable memory including, for example, persistent storage, solid-state memory, remotely mounted memory, magnetic media, optical media, random access memory (RAM), read-only memory (ROM), mass storage media (for example, a hard disk), removable storage media (e.g., a flash drive, a Compact Disk (CD) or a Digital Video Disk (DVD)), and/or any other volatile, non-transitory device readable and/or computer executable memory devices that store information, data, and/or instructions that may be used by the processing circuitry. The memory may store any suitable instructions, data or information, including a computer program, software, an application including one or more of logic, rules, code, tables, etc. and/or other instructions capable of being executed by the processing circuitry to perform the various functionalities described herein. The memory may store responses written to memory by a script, such as an intelligent script or speech-enabled intelligent script. In some cases, the processing circuitry and device readable medium may be considered to be integrated.

In the example embodiment of FIG. 1, system 100 also includes a plurality of operator stations 108a through 108n. Operator stations 108a through 108n are coupled to service platform 106 through communications link 120. Additionally, in the example embodiment of FIG. 1, operator stations 108 are capable of receiving, collecting, storing, and/or communicating data to and/or from network 104. In the example embodiment of FIG. 1, operator stations 108a through 108n are coupled to network 104 through communications links 118a and 118n, respectively. In certain embodiments, operator stations 108a through 108n may also be coupled to service platform 106 via communications links 118a and 118n, respectively, network 104, and communications link 116.

In certain embodiments, operator stations 108a through 108n may be comprised in a call center. For example, each operator station 108 may be a live agent-based data collection system capable of collecting data from, for example, clients 102. Although operator station 108 is an agent-based system in the example embodiment of FIG. 1, the present disclosure contemplates that other suitable data collection system may be used without departing from the scope of the present disclosure.

As used herein, the term agent should be interpreted broadly to encompass any individual that a user of a client 102 may be connected to, whether as part of an incoming call from client 102 routed to service platform 106 or as part of an outgoing call transmitted from service platform 106 to a user of client 102. As non-limiting examples, an agent may refer to an agent working in a call center (e.g., at one of operator stations 108), an employee of an organization associated with service platform 106 and/or operator stations 108, a technician (that may or may not be working remotely from a call center), or any other suitable person or entity. Although certain embodiments may describe an agent as an operator associated with an operator station 108 in a call center, the present disclosure is not limited to such an example embodiment. Rather, the various embodiments described herein may be applied to other suitable scenarios, such as those in which operator stations 108 do not make up a traditional call center (having a plurality of operator stations in one, centralized location). For example, in certain embodiments operator stations 108 may be distributed geographically and may couple to service platform 106 and clients 102 via one or more different networks.

Operator stations 108 may comprise any suitable computing and/or communicating device or combination of devices. In the example embodiment of FIG. 1, each operator station 108 includes a host 112 and a communication device 114. Communication device 114 enables an agent to communicate with client 102. Communication device 114 may comprise, for example, a telephone, a wireless device, a voice over IP device, or any other computing and/or communicating device or combination of devices. Although the example embodiment of FIG. 1 illustrates host 112 and communication device 114 as separate devices, one device that is capable of performing the desired functionality could be used without departing from the scope of the present disclosure.

Host 112 may comprise, for example, a desktop computer, a laptop computer, a server computer, a personal digital assistant, and/or any other computing or communicating device or combination of devices. In certain embodiments, host 112 may be connected to a PBX-based ACD or the ACD of service platform 106. Host 112 may be configured to run software, such as a soft agent. The soft agent may, for example, include a SIP-based soft phone and switch-specific computer telephony integration (CTI) control of the agent state during call handling. The soft agent may provide an interface to service platform 106, and in particular to applications server 120 and softswitch server 122 of service platform 106. Host 112 may include a graphical user interface (GUI) that enables a live agent to collect, enter, process, store, retrieve, amend, and/or dispatch data during the interaction of operator station 108 with a user of client 102 (e.g., during a call). Host 112 may run console software that provides, for example, IP-based call handling using the GUI and, for example, an input device (such as a mouse, keyboard, microphone, or other suitable input device).

Each host 112 may be capable of executing and/or displaying one or more intelligent scripts and/or other types of scripts that at least partially contribute to the collection of data from the user of client 102. As described above, an intelligent script may guide call center agents through call completion steps. In certain embodiments, an intelligent script presents the appropriate options for each call type an agent handles, eliminating errors and reducing training time. In certain embodiments, the intelligent scripts facilitate the presentation of one or more queries to collect data from one or more clients. As described above, intelligent scripts may contain any number of elements, actions, and screens. Each intelligent script has a unique flow to present the elements, actions, and screens in the preferred order for each scenario. Branching and decision trees are available within the intelligent scripts to customize the flow of elements based on selections, date/time, or data. In one particular non-limiting example, an intelligent script can comprise a series of queries requesting information and/or data from a user (e.g., a user of a client 102) of service platform 106. In some cases, intelligent scripts may include, for example, an HTML-based script, an XML-based script, a JSON-based script, or a combination of these or other scripting formats.

In the example embodiment of FIG. 1, system 100 includes at least a first communications link 110, a second communications link 116, and a third communications link 118 each operable to facilitate the communication of data to and/or from network 104. In some embodiments, system 100 can include a fourth communications link 120 operable to facilitate the communication of data between service platform 106 and operator stations 108. Communications links 110, 116, 118, and 120 may include any hardware, software, firmware, or combination thereof. In various embodiments, communications links 110, 116, 118, and 120 may comprise communications media capable of assisting in the communication of analog and/or digital signals. Communications links 110, 116, 118, and 120 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication of information.

In certain embodiments, in operation a user of client 102 initiates a call (e.g., dials the digits of a telephone number) using a computing and/or communication device, such as a telephone. The called number may be associated with a call center, such as a call center comprising operator stations 108. The call is routed (e.g., via network 104 in the example embodiment of FIG. 1) to service platform 106. In an alternative embodiment, service platform 106 and/or operator station 108 can initiate an outbound call to a user of client 102.

Applications server 122 is configured to receive an indication that a call from a calling party directed to a called number was received. In certain embodiments, the indication that the call from the calling party directed to a called number was received may be sent from softswitch server 122. For example, an incoming call may be received at the softswitch of softswitch server 122. In response to receiving the incoming call, softswitch server 122 may send an indication to applications server 122 that the call from the calling party directed to the called number was received. As another example, softswitch server 122 may initiate an outgoing call to a user (e.g., a user of a client 102). When the user answers the call, softswitch server 122 may send an indication to applications server 122 that the call from the calling party (e.g., an outbound dialer at the call center) to a called number (e.g., the telephone number of the user of the client 102) was received.

Applications server 122 is configured to determine, in response to the indication that the call was received, whether to route the call to an available agent or to a speech-enabled intelligent script associated with one of the called number or the calling party. Applications server 122 is configured to instruct softswitch server 122 to route the call to the speech-enabled intelligent script in response to a determination to route the call to the speech-enabled intelligent script. As described above, the speech-enabled intelligent script is configured to guide a user on the call through the speech-enabled intelligent script using one or more of pre-recorded prompts, voice menus, and text-to-speech prompts. Applications server 122 is configured to instruct softswitch server 122 to route the call to the available agent in response to a determination to route the call to the available agent.

Applications server 122 may be configured to determine whether to route the call to an available agent or to a speech-enabled intelligent script in any suitable manner. As one example, in certain embodiments applications server 122 may be configured to determine whether to route the call to an available agent or to a speech-enabled intelligent script based on information associated with the user. The information may include any suitable information, such as, for example, information about previous agent interactions, agent experience, call analytics, call duration, call disposition, user preferences, and any other suitable information. In certain embodiments, the information may be stored in database server 126.

In certain embodiments, applications server 120 may be configured to use artificial intelligence functionality to determine whether to route the call to an available agent or to a speech-enabled intelligent script based on the information associated with the user. In doing so, applications server 120 may be configured to self-learn and adjust the logic as calls are processed. Applications server 120 employing artificial intelligence functionality may be configured to use the information associated with the user to predict a preferred behavior for subsequent calls. For example, in certain embodiments, if a user has recently spoken to specific agent, applications server 120 may be configured to attempt to route the call to that same agent. As another example, in certain embodiments if a user has recently spoken to a specific agent, and specified a negative experience in a survey, applications server 120 may be configured to attempt to find an alternate agent.

As another example, in certain embodiments applications server 120 may be configured to determine whether to route the call to the available agent or to the speech-enabled intelligent script based on whether an agent is available to answer the call. Applications server 120 may be configured to instruct softswitch server 122 to route the call to the available agent in response to a determination that the agent is available to answer the call. If the call is routed to an available agent (e.g., an agent at an operator station 108), the agent may gather information from the user of a client 102. During the call, the agent collects information from the user of client 102. The collected information may be communicated (e.g., from host 112) through communications link 120 to a memory accessible to service platform 106, such as at database server 126. In other embodiments, the data collected by operator station 108 may be communicated to database server 126 of service platform 106 through network 104 or another suitable communication link. Storing the collected data in a common memory can be useful in facilitating later retrieval and use of that data.

Applications server 120 may be configured to instruct softswitch server 122 to route the call to the speech-enabled intelligent script in response to a determination that the agent is not available to answer the call. In operation, applications server 120 may determine that no agent is available and instruct softswitch server 122 to route the call to the speech-enabled intelligent script. Routing the call to a speech-enabled intelligent script may advantageously provide a method for handling of calls during peak times where an inadequate number of agents are available to handle the increased call load at the call center. In certain embodiments, applications server 120 is configured to obtain, using resource server 124 (e.g., using the speech recognition engine of resource server 124), one or more of selections and data inputs from the user in response to the one or more of pre-recorded prompts, voice menus, and text-to-speech prompts of the speech-enabled intelligent script.

In certain embodiments, applications server 120 is configured to obtain information associated with the user (e.g., a calling party) from database server 126. In certain embodiments, applications server 120 may be configured to dynamically generate at least one text-to-speech prompt of the speech-enabled intelligent script based on the obtained information associated with the user. For example, in certain embodiments applications server 120 may be configured to use the artificial intelligence functionality described above to optimize the speech-enabled intelligent script. Applications server 120 may be configured to modify the speech-enabled intelligent script prompts or questions based on artificial intelligence self-learning and the information stored about previous call interactions. For instance, in certain embodiments if a user has previously interacted with a speech-enabled intelligent script or other intelligent script, applications server 120 may be configured to use the artificial intelligence functionality to retrieve information about the previous interaction, and use that information to optimize the flow for the current call, such as verifying the user's demographic information, rather than prompting for it.

Applications server 120 may be configured to obtain at least one of the one or more of selections and data inputs from the user in response to the dynamically generated at least one text-to-speech prompt. Applications server 120 may be configured to store the obtained one or more selections and data inputs from the user in database server 126. For example, the collected information may be stored at database server 126.

In certain embodiments, applications server 120 is configured to monitor an availability of one or more agents while the user is interacting with the speech-enabled intelligent script. For example, applications server 120 may be configured to maintain a listing of connected agents and calls, and the skills associated with each agent. Applications server 120 may be configured to determine that an agent is now available to answer the call. Applications server 120 may be configured to instruct softswitch server 122 to transfer the call to the agent that is now available to answer the call. In certain embodiments, applications server 120 may be configured to automatically instruct softswitch server 122 to transfer the call to the agent that is now available to answer the call when it is determined that the agent is now available. In certain embodiments, applications server 120 may be configured to query the user as to whether the user would prefer to be transferred from the speech-enabled intelligent script to an available agent, and configured to instruct softswitch server 122 to transfer the call to the agent that is now available in response to an indication from the user that the user desires to be transferred out of the speech-enabled intelligent script.

In certain embodiments, applications server 120 is configured to monitor a progress of the user through the speech-enabled intelligent script. Applications server 120 may be configured to send the one or more of selections and data inputs obtained from the user and an indication of the progress of the user through the speech-enabled intelligent script to the agent that is now available to answer the call.

As noted above, applications server 120 may be coupled to operator stations 108 via communication link 120 or via communication link 116 and network 104. In certain embodiments, in particular, applications server 120 may be coupled to a GUI of a host 112 of an operator station 108. Applications server 120 may be configured to display, on the GUI, a visual representation of the speech-enabled intelligent script and an indication of the progress of the user through the speech enabled intelligent script. In certain embodiments, this may be achieved using a script monitor panel. The script monitor panel may provide agents and administrators with the ability to monitor calls in speech-enabled intelligent scripting. This advantageously enables an agent or administrator to offer expert assistance or manually choose to route the call to an agent if the user has any difficulties with any part of the speech-enabled intelligent script.

In certain embodiments, the script monitor panel may be configured to show current calls in progress and the current step in an intelligent script, whether the user is interacting with a speech-enabled portion of the script, or an agent portion of the script. In certain embodiments, applications server 120 may be configured to use the script monitor panel to offer suggestions and actions based on logic that is monitoring current steps and input. In certain embodiments, the applications server (in tandem with resource server 124) is configured to employ logic that is configured to look for certain keywords or utilize natural language speech recognition to look for phrases or general content.

In certain embodiments, applications server 120 may be configured to determine, based on the one or more selections and data inputs obtained from the user, a measurement of user satisfaction. For example, applications server 120 (alone or in combination with elements of resource server 124, such as a speech recognition engine) may be configured to monitor the user's inflection, the words used during to call, and/or other aspects of the interaction between a user and the speech-enabled intelligent script. As noted above, resource server 124 may be configured to use natural language speech recognition. In certain embodiments, applications server 120 may utilize the natural language speech recognition to detect user satisfaction. Based on the monitored aspects of the call, applications server 120 may be configured to determine the user's level of satisfaction with the user's interaction with the speech-enabled intelligent script. Applications server 120 may be configured to display, on the GUI of the host 112, a visual indication of the measurement of user satisfaction. For example, the script monitor panel may reflect the satisfaction level as an image or other display, providing a visual indication of the current user satisfaction.

In certain embodiments, applications server 120 may be configured to determine that a user is to provide protected information (e.g., protected health information or payment information). Applications server 120 may determine that the user is to provide protected information in any suitable manner. For example, certain portions of an intelligent script may be associated with an indicator that indicates to applications server 120 that a portion of the script calls for the user to provide protected information. In some cases, the indication may be that certain portions of an intelligent script are designated as speech-enabled. Applications server 102 may be configured to instruct softswitch server 122 to route the call from an agent to the speech-enabled intelligent script in response to a determination that the calling party is to provide protected information. In certain embodiments, applications server 120 may be configured to obtain the protected information from the calling party in response to the one or more of pre-recorded prompts, voice menus, and text-to-speech prompts of the speech-enabled intelligent script. Applications server 120 may be configured to store the obtained protected information in database server 126. Applications server 120 may be configured to mask the obtained protected information such that it cannot be viewed by the available agent. In certain embodiments, applications server 120 may be configured to instruct softswitch server 122 to route the call from the speech-enabled intelligent script associated with the called number back to the available agent after obtaining the protected information.

In certain embodiments, service platform 106 may be configured to provide speech-enabled scripting of post-call surveys. As described above, intelligent scripts involve agent interactions with users. In some cases, it may be desirable to ask the user to take a post-call survey to assess their interaction with the agent. In certain embodiments, applications server 120 may be configured to use speech-enabled intelligent scripts to route a user into a speech-enabled post-call survey after the agent portion of the call is complete. The survey may be in the form of a speech-enabled intelligent script that asks the user a series of questions and gathers the responses. In certain embodiments, applications server 120 may be configured to use the responses for agent assessment as well as for call-related information that may influence future call routing (for example using the artificial intelligence functionality described above).

Although certain exemplary embodiments have been described above in the context of handling a telephone call received at a call center, the present disclosure is not limited to these example embodiments. Rather, the present disclosure contemplates that the various embodiments described herein may be applied to other forms of communication. For example, the various embodiments described herein may be applied to multimedia communications (including, but not limited to, texting, chatting, and video communications). According to one example embodiment, the calling party may be a user attempting to establish a communication session with an agent (e.g., an agent associated with a host 112 described above) using one of the above-described exemplary forms of multimedia communication or another suitable form of communication. In such a scenario, the called number may be an IP address, uniform resource locator (URL) or other information used to establish a multimedia communication session between the user and the agent. The communication session may be handled in accordance with the principles of the various embodiments described herein.

For instance, in certain embodiments a user of a client device 102 may visit a Web site associated with a company utilizing a call center including service platform 106 described above. In some cases, the Web site may include a "Contact Us" button or other suitable mechanism to enable the user to initiate a communication session with an agent (e.g., via one of the forms of multimedia communication described above). As an alternative, the Web site may include an automated prompt presented to the user to enable the user to establish a communication session with the agent (e.g., a chat, text, or video conversation). It should be understood, however, that other forms of establishing the communication session between the user of a client 102 and an agent may be used.

In certain embodiments, applications server 120 may be configured to receive an indication that the user has attempted to establish a communication with an agent. In certain embodiments, the indication may be received in response to an input (e.g., from the user) indicating that the user desires to establish a communication with an agent (such as the user selecting the "Contact Us" button or providing a suitable input in response to the presented prompt). In certain embodiments, the indication received at applications server 120 may be received via web server 128 of service platform 106. Applications server 120 may be configured to determine, in response to the received indication, whether to route the communication to an available agent or to an intelligent script and/or speech-enabled intelligent script (which may depend on the type of communication requested by the user, as described in more detail below). In certain embodiments, applications server 120 may be configured to determine whether to route the communication to an available agent or to an intelligent script or speech-enabled intelligent script based on whether an agent is available. Additionally or alternatively, applications server 120 may be configured to determine whether to route the communication to an available agent or to an intelligent script or speech-enabled intelligent script based on information associated with the user (e.g., using the artificial intelligence functionality described above, which may be configured to use the information associated with the user to predict a preferred behavior for the communication).

For example, applications server 120 may be configured to determine whether an agent is available using one or more of the various techniques described herein (e.g., based on monitoring of agent availability, skill table information, and/or any other suitable information) or another suitable means. Applications server 120 may be configured to route the communication to an available agent in response to a determination that an agent is available to answer the call. For example, applications server 120 may be configured to establish the appropriate type of multimedia communication session between the user and an available agent. In certain embodiments, applications server 120 may work in concert with one or more other elements of service platform 106 to establish the appropriate type of communication between the user and agent (e.g., web server 128 and/or softswitch server 122). Once established, the communication session may proceed as described above (and in more detail below, for example, in relation to FIGS. 2-4).

Applications server 120 may be configured to route the communication to an intelligent script or speech-enabled intelligent script in response to a determination that an agent is not available to handle the communication. Whether the call is routed to the intelligent script or speech-enabled intelligent script may depend on the type of communication session. Applications server 120 may be configured to determine the type of communication requested by the user and, based on this determination, route the communication to either the intelligent-script or the speech-enabled intelligent script. For example, applications server 120 may be configured to route the communication to the intelligent script if the type of communication is determined to be text or chat. In such a scenario, applications server 120 may be configured to present the prompts associated with the intelligent script to the user. As another example, applications server 120 may be configured to route the communication to the speech-enabled intelligent script if the type of communication is determined to be a video conversation. In certain embodiments, applications server 120 may work in concert with one or more other elements of service platform 106 to establish the appropriate type of communication between the user and agent (e.g., web server 128 and/or softswitch server 122). Once established, the communication session may proceed as described above (and in more detail below, for example, in relation to FIGS. 2-4.

Figure 2:
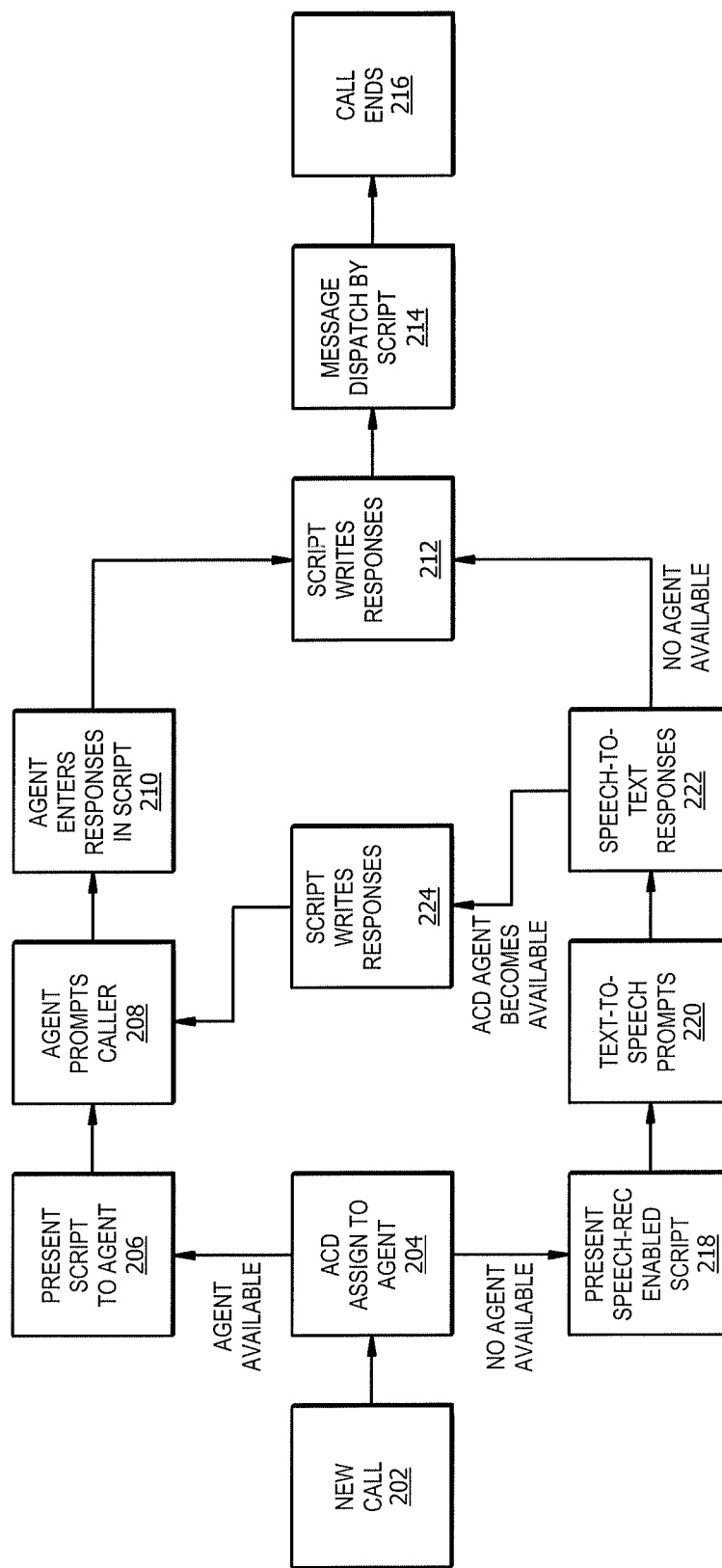
FIG. 2 is a flow diagram of an exemplary process for handling a call using speech-enabled intelligent scripting, in accordance with certain embodiments.

FIG. 2 is a flow diagram of an exemplary process for handling a call using speech-enabled intelligent scripting, in accordance with certain embodiments. At block 202, the service platform receives an indication that a call from a calling party directed to a called number was received. In certain embodiments, the call from the calling party directed to the called number may be an incoming call from a user (e.g., a user of a client 102 described above in relation to FIG. 1) to a called number. In such a scenario, the called number may be associated with an individual or entity that the user (the calling party) is attempting to reach. For example, the called number may be associated with a call center established to handle calls directed to a particular company or other entity. In certain embodiments, the call from the calling party directed to the called number may be an outbound call (e.g., from an automated outbound dialing system or an agent at an operator station such as operator station 108 described above in relation to FIG. 1) directed to a user (e.g., a user of a client 102 described above in relation to FIG. 1). When the outbound call is connected to the user, the service platform may receive an indication that the outbound call has been connected to allow the service platform to appropriately route the call.

The service platform may receive the indication in any suitable manner. In certain embodiments, the service platform may receive the indication as described above in relation to FIG. 1. In other words, in certain embodiments a softswitch server of the service platform (e.g., softswitch server 122 of service platform 106 described above in relation to FIG. 1) may send an indication an applications server (e.g., applications server 120 described above in relation to FIG. 1) that the call from the calling party directed to the called number was received.

At block 204, the service platform executes a call behavior. As described above in relation to FIG. 1, the service platform may have ACD functionality (which may be provided by the applications server of the service platform). One of the call behaviors may be to route the call to the ACD. The ACD determines whether to route the call to an available agent or to a speech-enabled intelligent script associated with one of the called number (e.g., in the case of an incoming call from the user) or the calling party (e.g., in the case of an outbound call to the user). In certain embodiments, the ACD behavior has parameters within one or more skill tables that define which agents are eligible to handle the call. In certain embodiments, the ACD behavior may use skill group assignments that define which agents are eligible to handle the call.

In certain embodiments, the ACD (or other functionality included at the applications server of the service platform) may determine information related to the call. As one example, a type of the call may be determined. The type of call may be determined in any suitable manner. For example, in certain embodiments the type of call may be determined based on information about the calling party, the called party, one or more inputs or other data provided by the calling party, and/or any other suitable information (such as information stored in a database server of the service platform, such as database server 126 described above in relation to FIG. 1).

If at block 204 it is determined that an eligible agent is available, the process proceeds to block 206 where the call is routed to that agent and presented on their screen (e.g., on a GUI of a host, such as host 112 described above in relation to FIG. 1). At this point, an intelligent script may be initiated. As described above, the intelligent script presents an agent with questions and other input. In certain embodiments, the intelligent script (and/or the questions and other input included in the script) may be determined based on the call type.

At block 208, the agent prompts the caller (or the called party in the case of an outbound call) with questions and other input based, for example, on the intelligent script. At block 210, the agent enters responses into the script. In certain embodiments, the steps at blocks 208 and 210 may be repeated as the call progresses. At step 212, the intelligent script writes responses. In certain embodiments, the intelligent script may write responses into memory. The responses written to memory may be accessible to other scripts, including a speech-enabled intelligent script such as the one described in more detail below in relation to block 218. The responses written to memory may be accessible to other elements of the service platform (such as, for example, application server 120 or resource server 124 described above in relation to FIG. 1). In certain embodiments, the intelligent script may write responses to the database (such as a database in database server 126 described above in relation to FIG. 1). The responses written to the database may be accessible to other scripts, including a speech-enabled intelligent script such as the one described in more detail below in relation to block 218. The responses written to the database may be accessible to other elements of the service platform (such as, for example, application server 120 or resource server 124 described above in relation to FIG. 1).

Although FIG. 2 illustrates an example embodiment in which the script writes responses after the agent enters responses into the intelligent script at step 210, the present disclosure is not limited to such an example embodiment. In certain embodiments, the intelligent script may write a response to memory or the database each time the agent enters a response. In other words, in certain embodiments the intelligent script may write responses to memory or to the database as the agent enters the responses into the intelligent script.

At step 214, one or more messages may be dispatched by the intelligent script. At step 216, the call ends.

Often times, however, no agent is available to answer the user's call immediately. For example, the call may be received during peak load times when the call center lacks the resources to handle every call it receives. With prior approaches, these calls typically sit in a queue waiting for an eligible agent to become available. In certain embodiments, the ACD behavior and skill table of the service platform may have logic that assesses whether the call should wait in the queue for an agent to become available, or whether the call should become speech-enabled. The logic may be configurable within the ACD behavior and skill table for each call type. The logic may include one or more criteria to assess whether the call should wait in the queue for an agent to become available, or whether the call should become speech-enabled (i.e., routed to a speech-enabled intelligent script). For example, in certain embodiments the one or more criteria may include one or more of an expected wait time, a time of day, and agent availability. In certain embodiments, the logic may determine whether the call should wait in the queue for an agent to become available, or whether the call should become speech-enabled, based on information about previous call interactions of the user.

If at block 204 it is determined that an eligible agent is not available and that the call should be routed to a speech-enabled intelligent script, the process proceeds to block 218 where the call is routed to a speech-enabled intelligent script. At block 220, the speech-enabled intelligent script presents the caller with questions and other input based on the speech-enabled branching defined within the speech-enabled intelligent script. In certain embodiments (and as illustrated in FIG. 2), this may be accomplished using text-to-speech prompts. Additionally or alternatively, pre-recorded prompts and/or voice menus may also be used. In certain embodiments, the speech-enabled intelligent script (or a section thereof) may include prompts and/or questions similar to those in the intelligent script provided to the agent had one been available. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on previous call interactions.

At block 222, the user (e.g., the calling party in the case of an incoming call routed to the service platform or the called party in the case of an outbound call from the service platform) makes selections and inputs data (e.g., using DTMF entry or speech recognition entry) in response to the prompts or questions posed by the speech-enabled intelligent script. In certain embodiments (and as illustrated in FIG. 2), the speech-enabled intelligent script may use speech-to-text functionality (which may, in certain embodiments, be provided by a resource server such as resource server 124 described above in relation to FIG. 1) to process the inputs provided by the user.

In certain embodiments, the service platform can continually monitor for an available agent while the user is being guided through the speech-enabled intelligent script. In some cases, the service platform may determine that an agent is now available to answer the call. If the service platform determines that an agent is available to answer the call, the process of FIG. 2 proceeds to block 224, where the intelligent script writes responses. In certain embodiments, all (or at least a portion) of the information gathered by the speech-enabled intelligent script up to the point that it was determined that an agent is now available is preserved and presented to an agent. In certain embodiments, the speech-enabled intelligent script may write responses into memory. The responses written to memory may be accessible to other scripts, including an intelligent script such as the one described above in relation to blocks 206-212. The responses written to memory may be accessible to other elements of the service platform (such as, for example, application server 120 or resource server 124 described above in relation to FIG. 1). In certain embodiments, the speech-enabled intelligent script may write responses to the database (such as a database in database server 126 described above in relation to FIG. 1). The responses written to the database may be accessible to other scripts, including an intelligent script such as the one described above in relation to blocks 206-212. The responses written to the database may be accessible to other elements of the service platform (such as, for example, application server 120 or resource server 124 described above in relation to FIG. 1).

Although FIG. 2 illustrates an example embodiment in which the speech-enabled intelligent script writes responses after the user makes selections and/or enters data at step 222, the present disclosure is not limited to such an example embodiment. In certain embodiments, the speech-enabled intelligent script may write a response to memory and/or the database each time the user provides a response. In other words, in certain embodiments the speech-enabled intelligent script may write responses to memory and/or to the database as the users provides responses.

In certain embodiments, the information gathered by the speech-enabled intelligent script may be populated (e.g., from memory or the database) into an intelligent script that is then presented to the agent (e.g., on a GUI of a host of an operator station, such as host 112 of an operator station 108 described above in relation to FIG. 1). This enables the agent to pick up right where the speech-enabled interaction has left off when, as depicted in FIG. 2, the process proceeds to block 208 and an agent takes over the call. In certain embodiments, all of the information gathered to this point by the speech-enabled intelligent script, and/or the current step in the script, are preserved and presented to the agent when the agent takes over the call at block 208. In this scenario, the process proceeds from block 208 to blocks 210, 212, 214, and 216 as described above.

Often times, however, no agent may become available during the course of the call. In such a scenario, the caller remains connected to the speech-enabled intelligent script for the duration of the call. The process then proceeds to block 212 where the speech-enabled intelligent script writes the responses provided by the caller to, for example, memory and/or a database (e.g., a database of database server 126 of service platform 106 described above in relation to FIG. 1). The process then proceeds from block 212 to blocks 214 and 216, where one or more messages may be dispatched by the speech-enabled intelligent script and the call ends, respectively.

In certain embodiments, the service platform may provide agents and administrators with the ability to monitor calls in speech-enabled intelligent scripting. In certain embodiments, this may be achieved using a script monitor panel. The script monitor panel may be an element presented on a GUI of a host being used by an agent. The script monitor panel may display information about the interaction between the caller (or the called party in the case of an outbound call) that may advantageously enable an agent or other party supervising the call to influence the handling of the call. This may advantageously enable an agent or administrator to offer expert assistance or manually choose to route the call to an agent if the caller has any difficulties with any part of the speech-enabled intelligent script.

Although the example embodiment of FIG. 2 has been described in the context of handling a call received at a call center, the present disclosure is not limited to this example embodiment. Rather, the present disclosure contemplates that the example embodiment of FIG. 2 may be applied to other forms of communication, such as the multimedia communications described above in relation to FIG. 1.

Figure 3:
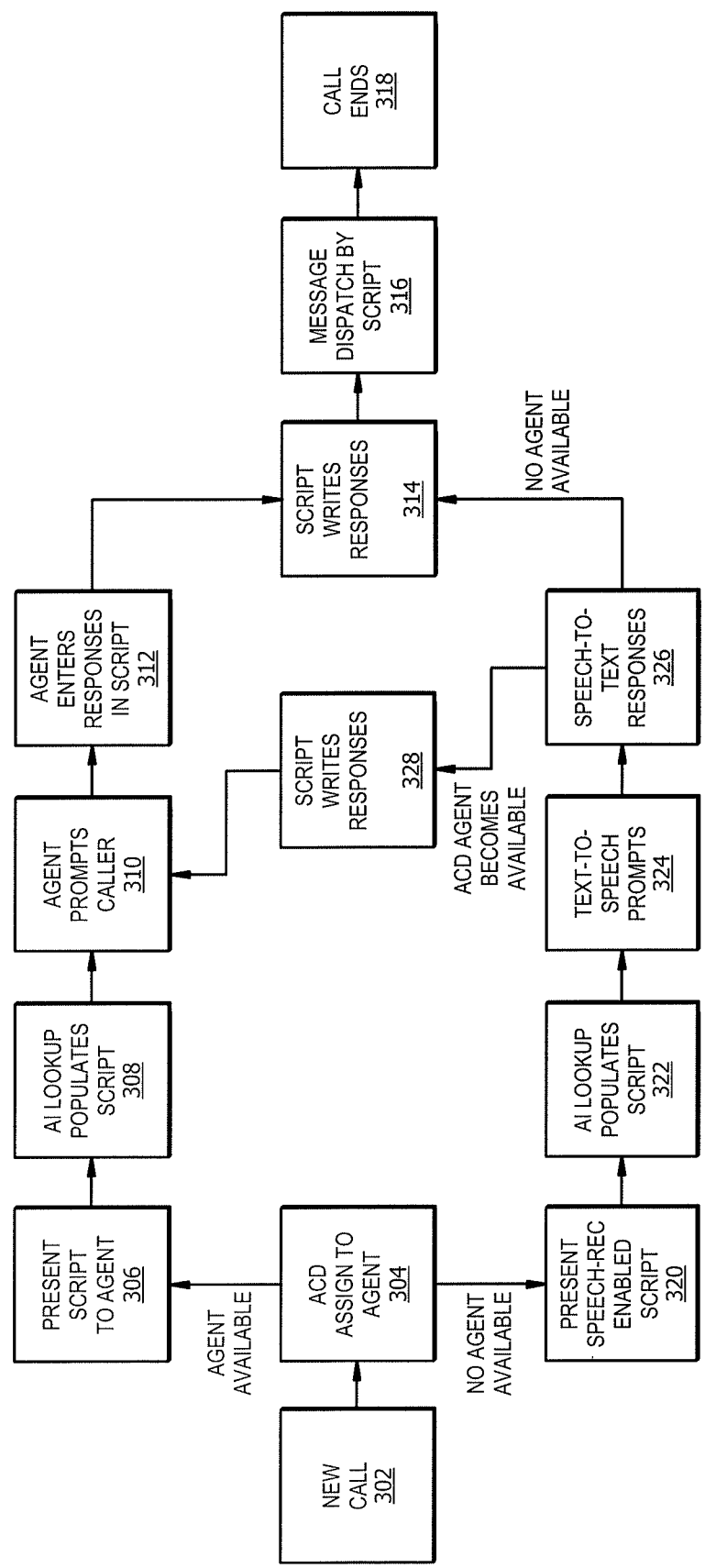
FIG. 3 is a flow diagram of another exemplary process for handling a call using speech-enabled intelligent scripting, in accordance with certain embodiments.

FIG. 3 is a flow diagram of another exemplary process for handling a call using speech-enabled intelligent scripting, in accordance with certain embodiments. The process of FIG. 3 begins in an analogous manner to that described above in relation to FIG. 2. More particularly, at block 302, the service platform receives an indication that a call from a calling party directed to a called number was received. As described above in relation to FIG. 2, the call from the calling party directed to the called number may be an incoming call initiated by a user (e.g., a user of a client 102 described above in relation to FIG. 1) to a called number that is routed to the service platform or an outbound call (e.g., from an automated outbound dialing system or agent at an operator station such as operator station 108 described above in relation to FIG. 1) directed to the user (e.g., a user of a client 102) described above in relation to FIG. 1). The service platform may receive the indication in any suitable manner, such as in the manner described above in relation to FIG. 2.

At block 304, the service platform executes a call behavior. As described above in relation to FIG. 2, the service platform may have ACD functionality (which may be provided by an applications server of the service platform) that determines whether to route the call to an available agent or to a speech-enabled intelligent script associated with one of the called number (e.g., in the case of an incoming call from the user) or the calling party (e.g., in the case of an outbound call to the user). At block 304, the ACD may use parameters within skill tables to determine whether an eligible agent is available to answer the call as described above in relation to FIG. 2.

If at block 304 it is determined that an eligible agent is available, the process proceeds to block 306 where the call is routed to that agent and presented on their screen (e.g., on a GUI of a host, such as host 112 described above in relation to FIG. 1). At this point, an intelligent script may be initiated. As described above, the intelligent script presents an agent with questions and other input. In certain embodiments, the intelligent script (and/or the questions and other input included in the script) may be determined based on the call type.

In the example embodiment of FIG. 3, the process proceeds from block 306 to block 308, where the service platform (e.g., an applications server of the service platform, such as applications server 120 described above in relation to FIG. 1) employs artificial intelligence to self-learn and adjust the logic as calls are processed. In certain embodiments, artificial intelligence may store information about each call (e.g., in a database of the service platform, such as database server 126 described above in relation to FIG. 1). The artificial intelligence functionality may store any suitable information, including, for example, information about previous agent interactions, agent experience, call analytics, call duration, call disposition, and any other suitable information. The artificial intelligence functionality may use that information to predict a preferred behavior for subsequent calls. For example, in certain embodiments, if a caller has recently spoken to specific agent, the system may attempt to route the caller to that same agent. As another example, in certain embodiments if a caller has recently spoken to a specific agent, and specified a negative experience in a survey, the system may attempt to find an alternate agent.

After artificial intelligence is applied to optimize the intelligent script at block 308, the process proceeds to block 310, where the agent prompts the caller (or the called party in the case of an outbound call) with questions and other input based, for example, on the optimized intelligent script. At block 312, the agent enters responses into the script. In certain embodiments, the steps at blocks 310 and 312 may be repeated as the call progresses.

At step 314, the intelligent script writes responses. In certain embodiments, the intelligent script may write responses into memory. The responses written to memory may be accessible to other scripts, including a speech-enabled intelligent script such as the one described in more detail below in relation to blocks 320-324. The responses written to memory may be accessible to other elements of the service platform (such as, for example, applications server 120 or resource server 124 described above in relation to FIG. 1). In certain embodiments, the intelligent script may write responses to the database (such as a database in database server 126 described above in relation to FIG. 1). The responses written to the database may be accessible to other scripts, including a speech-enabled intelligent script such as the one described in more detail below in relation to blocks 320-324. The responses written to the database may be accessible to other elements of the service platform (such as, for example, application server 120 and/or resource server 124 described above in relation to FIG. 1).

Although FIG. 3 illustrates an example embodiment in which the intelligent script writes responses after the agent enters responses into the intelligent script at step 312, the present disclosure is not limited to such an example embodiment. In certain embodiments, the intelligent script may write a response to memory and/or the database each time the agent enters a response. In other words, in certain embodiments the intelligent script may write responses to memory and/or to the database as the agent enters the responses into the script.

At step 316, one or more messages may be dispatched by the intelligent script. At step 318, the call ends.

As described above, however, often times no agent is available to answer the user's call immediately. If at block 304 it is determined that an eligible agent is not available and that the call should be routed to a speech-enabled intelligent script, the process proceeds to block 320 where the call is routed to a speech-enabled intelligent script. In certain embodiments, the speech-enabled intelligent script (or a section thereof) may include prompts and/or questions similar to those in the intelligent script provided to the agent had one been available. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on previous call interactions.

In the example embodiment of FIG. 3, the process then proceeds to block 322, where the service platform (e.g., an applications server of the service platform, such as applications server 120 described above in relation to FIG. 1) employs artificial intelligence to optimize the speech-enabled intelligent script. As described above, the service platform may use artificial intelligence to self-learn and adjust the logic as calls are processed. At block 322, the artificial intelligence functionality of the service platform uses stored information (e.g., information about previous agent interactions, agent experience, call analytics, call duration, call disposition, and any other suitable information) to optimize the speech-enabled intelligent script.

As noted above, speech-enabling the call (using a speech-enabled intelligent script) presents the caller with questions and other input based on the speech-enabled branching defined within the intelligent script. In some cases, the script prompts or questions are pre-configured. In other cases, such as the example embodiment illustrated in FIG. 3, artificial intelligence functionality is employed at block 322 optimize the script prompts or questions. In the example embodiment of FIG. 3, for example, the artificial intelligence functionality dynamically changes the script prompts or questions based on artificial intelligence self-learning and the information stored about previous call interactions. For example, in certain embodiments if a caller has previously interacted with a speech-enabled intelligent script or other intelligent script, the artificial intelligence functionality may be used at block 322 to retrieve information about the previous interaction, and use that information to optimize the flow for the current call, such as verifying the demographic information of the caller, rather than prompting for it.

Note that although the example embodiment of FIG. 3 illustrates the use of artificial intelligence functionality at particular points in the exemplary process of FIG. 3 (e.g., at blocks 308 and 322), this is for purposes of example only and the present disclosure is not limited to the example embodiment of FIG. 3. Rather, the present disclosure contemplates that artificial intelligence functionality may be used at any suitable point during the process of handling a call using speech-enabled intelligent scripting. In particular, in certain embodiments artificial intelligence functionality may be employed in addition to or as an alternative to the artificial intelligence functionality provided at blocks 308 and 322 in the exemplary embodiment of FIG. 3. For example, in certain embodiments artificial intelligence functionality may also be used to determine whether to route the call to an available agent or to a speech-enabled intelligent script at block 304 (e.g., based on information associated with the user as described above in relation to FIG. 1).

After the speech-enabled intelligent script has been optimized at block 322, the process proceeds to block 324, where the speech-enabled intelligent script presents the caller with questions and other input based on the speech-enabled branching defined within the intelligent script. In certain embodiments (and as illustrated in FIG. 3), this may be accomplished using text-to-speech prompts. Additionally or alternatively, pre-recorded prompts and/or voice menus may be used (for example, as described above in relation to FIG. 2).

At block 326, the user (e.g., the calling party in the case of an incoming call routed to the service platform or the called party in the case of an outbound call) makes selections and inputs data (e.g., using DTMF entry or speech recognition entry) in response to the prompts or questions posed by the speech-enabled intelligent script. In certain embodiments (and as illustrated in FIG. 3), the speech-enabled intelligent script may use speech-to-text functionality (which may, in certain embodiments, be provided by a resource server such as resource server 124 described above in relation to FIG. 1) to process the inputs provided by the user.

As described above in relation to FIG. 2, the service platform can continually monitor for an available agent while the user is being guided through the speech-enabled intelligent script. In some cases, the service platform may determine that an agent is now available to answer the call. If the service platform determines that an agent is available to answer the call, the process of FIG. 3 proceeds to block 328, where the intelligent script writes responses. In certain embodiments, all (or at least a portion) of the information gathered by the speech-enabled intelligent script up to the point that it was determined that an agent is now available is preserved and presented to an agent. In certain embodiments, the speech-enabled intelligent script may write responses into memory. The responses written to memory may be accessible to other scripts, including an intelligent script such as the one described above in relation to blocks 306-310. The responses written to memory may be accessible to other elements of the service platform (such as, for example, application server 120 and/or resource server 124 described above in relation to FIG. 1). In certain embodiments, the speech-enabled intelligent script may write responses to the database (such as a database in database server 126 described above in relation to FIG. 1). The responses written to the database may be accessible to other scripts, including an intelligent script such as the one described above in relation to blocks 306-310. The responses written to the database may be accessible to other elements of the service platform (such as, for example, application server 120 or resource server 124 described above in relation to FIG. 1).

Although FIG. 3 illustrates an example embodiment in which the speech-enabled intelligent script writes responses after the user makes selections and/or enters data at step 326, the present disclosure is not limited to such an example embodiment. In certain embodiments, the speech-enabled intelligent script may write a response to memory or the database each time the user provides a response. In other words, in certain embodiments the speech-enabled intelligent script may write responses to memory or to the database as the user provides responses.

In certain embodiments, the information gathered by the speech-enabled intelligent script may be populated (e.g., from memory or the database) into an intelligent script that is then presented to the agent (e.g., on a GUI of a host of an operator station, such as host 112 of an operator station 108 described above in relation to FIG. 1). This enables the agent to pick up right where the speech-enabled interaction has left off when, as depicted in FIG. 3, the process proceeds to block 310 and an agent takes over the call. In certain embodiments, all of the information gathered to this point by the speech-enabled intelligent script, and/or the current step in the script, are preserved and presented to the agent when the agent takes over the call at block 310. In this scenario, the process proceeds from block 310 to blocks 312, 314, 316, and 318 as described above.

Often times, however, no agent may become available during the course of the call. In such a scenario, the caller remains connected to the speech-enabled intelligent script for the duration of the call. In such a scenario, from block 326 the process proceeds to block 314 where the speech-enabled intelligent script writes the responses provided by the caller to, for example, memory and/or a database (e.g., a database of database server 126 of service platform 106 described above in relation to FIG. 1). The process then proceeds from block 314 to blocks 316 and 318, where one or more messages may be dispatched by the speech-enabled intelligent script and the call ends, respectively, as described above.

In certain embodiments, the service platform may provide agents and administrators with the ability to monitor calls in speech-enabled intelligent scripting using the script monitor panel as described above in relation to FIG. 2.

Although the example embodiment of FIG. 3 has been described in the context of handling a call received at a call center, the present disclosure is not limited to this example embodiment. Rather, the present disclosure contemplates that the example embodiment of FIG. 3 may be applied to other forms of communication, such as the multimedia communications described above in relation to FIG. 1.

Figure 4:
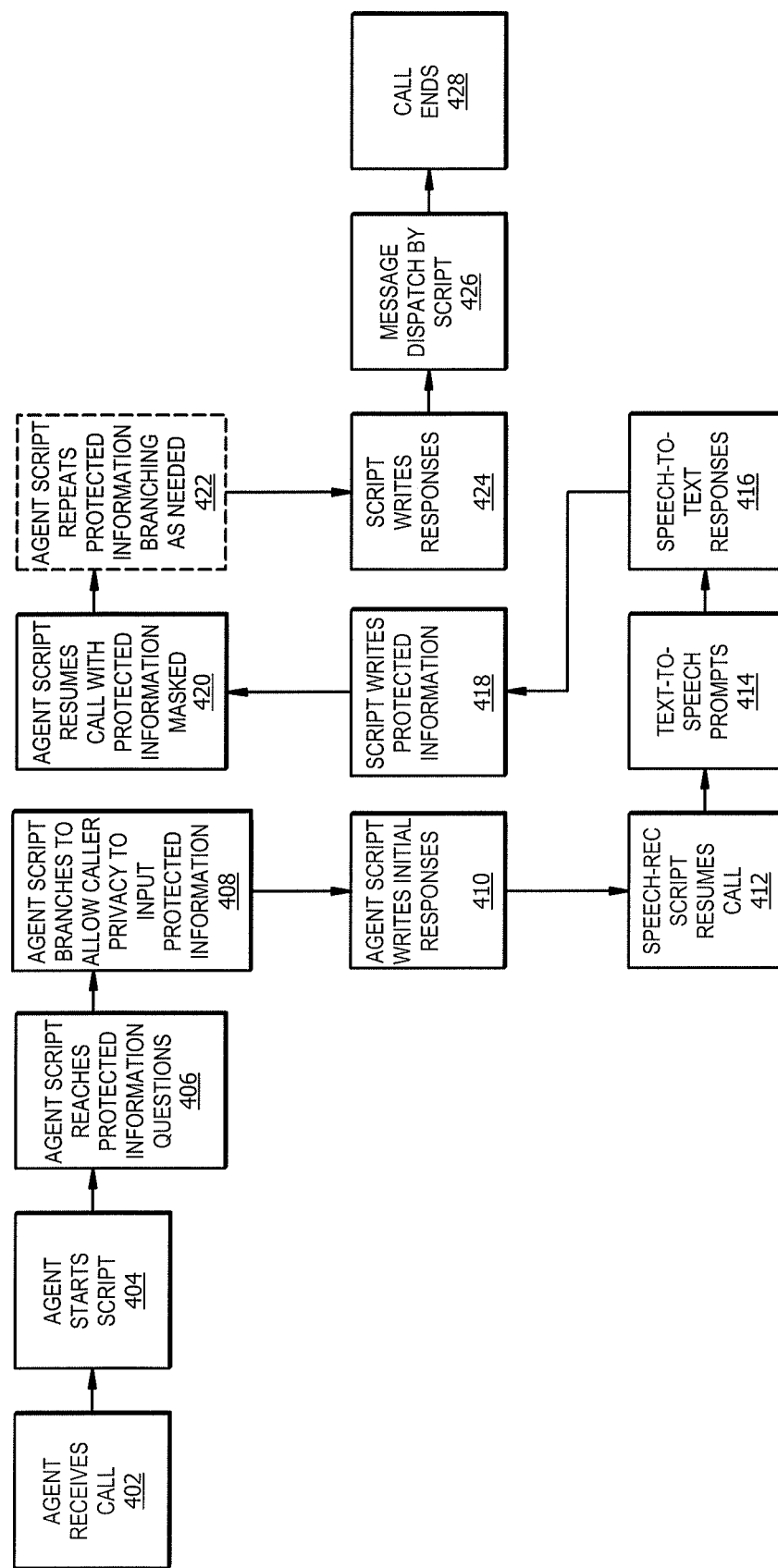
FIG. 4 is a flow diagram of another exemplary process for handling a call using speech-enabled intelligent scripting, in accordance with certain embodiments.

FIG. 4 is a flow diagram of another exemplary process for handling a call using speech-enabled intelligent scripting, in accordance with certain embodiments. The process begins at step 402, where an agent is connected to a call. Similar to FIGS. 2 and 3 described above, the call may be an incoming call initiated by a user (e.g., a user of a client 102 described above in relation to FIG. 1) to a called number that is routed to the service platform or an outbound call (e.g., from an automated outbound dialing function or an agent at an operator station such as operator station 108 described above in relation to FIG. 1) directed to a user (e.g., a user of a client 102) described above in relation to FIG. 1). In certain embodiments, the call may be routed to the agent by the service platform as described above in relation to blocks 202, 204, and 206 of FIG. 2 and blocks 302, 304, and 306 in FIG. 3. In certain embodiments, the call may have been originally routed to a speech-enabled intelligent script and been routed to the agent once the agent became available during the course of the call as described above in relation to blocks 222, 224, and 208 of FIG. 2 and blocks 326, 328, and 310 of FIG. 3.

At block 404, an intelligent script may be initiated. As described above, the intelligent script presents an agent with questions and other input. The agent prompts the caller (or the called party in the case of an outbound call) with questions and other input based, for example, on the intelligent script. The agent enters responses into the intelligent script.

Intelligent scripts may be used in a variety of scenarios, including those in which the caller or called party (in the case of an outbound call from a call center) may need to provide protected information. For example, intelligent scripts may be used to interact with healthcare patients. Interaction with healthcare patients often requires gathering of protected health information (PHI). PHI is protected under the Healthcare Insurance Portability and Accountability Act (HIPAA). As another example, intelligent scripts may be used to interact with customers who require payment processing. Interaction with payment processing is protected by Payment Card Industry (PCI) compliance requirements. PCI compliance ensures that credit card and other financial information is secure and protected. One of the advantages of speech-enabled intelligent scripting is that the protected information interaction can be speech-enabled, enabling the caller to provide the protected information without speaking to a call center agent. This advantageously improves the security of the protected information.

At block 406, the agent reaches a point in the intelligent script that requires the caller to provide protected information (e.g., PHI or PCI). The process proceeds to block 408, where the intelligent script branches to allow the caller privacy to input the protected information using a speech-enabled intelligent script. At block 410, the intelligent script writes the initial responses received from the caller (e.g., into memory or a database as described above in relation to FIGS. 2 and 3). At block 412, the call is routed from the agent to a speech-enabled intelligent script.

At block 414, the speech-enabled intelligent script presents the caller with questions and other input based on the speech-enabled branching defined within the intelligent script. As described above in relation to FIGS. 2 and 3, this may be accomplished using text-to-speech prompts, pre-recorded prompts and/or voice menus. In the example embodiment of FIG. 4, the questions relate to the protected information to be provided by the user. At block 326, the user (e.g., the calling party in the case of an incoming call routed to the service platform or the called party in the case of an outbound call) makes selections and inputs data (e.g., using DTMF entry or speech recognition entry) in response to the prompts or questions posed by the speech-enabled intelligent script. In certain embodiments (and as illustrated in FIG. 4), the speech-enabled intelligent script may use speech-to-text functionality (which may, in certain embodiments, be provided by a resource server such as resource server 124 described above in relation to FIG. 1) to process the inputs provided by the user. In the example embodiment of FIG. 4, the inputs relate to protected information.

After the user has provided the protected information at block 416, the process proceeds to block 418, where the speech-enabled intelligent script writes the responses provided by the caller (e.g., to memory or to a database as described above in relation to FIGS. 2 and 3). At block 420, the call is routed from the speech-enabled intelligent script back to the agent. In certain embodiments, the protected information can be hidden from the agent, ensuring that the information remains secure. For example, in certain embodiments the intelligent script can mask any protected information content that has been gathered in the speech-enabled portion of the intelligent script so it is not viewable by the call center agent.

Optionally, at block 422, the process of routing the call to a speech-enabled intelligent script may be repeated as needed to obtain additional protected information. In such a scenario, the call is routed to a speech-enabled intelligent script to obtain the protected information and then routed back to the agent as described above.

Although FIG. 4 illustrates one example embodiment for obtaining protected information from a user through a speech-enabled intelligent script, this is for purposes of example only. The present disclosure contemplates that speech-enabling of the questions and inputs related to protected information can be established at any point in the intelligent script. For example, in certain embodiments the script could start with the questions and input related to protected information and then route the caller to an available agent. As another example, in certain embodiments an agent could start with non-PHI processing and then route the call into the speech-enabled intelligent script to obtain protected information from the user.

Once all protected information has been obtained from the user, the process proceeds to block 424 where the intelligent script writes responses (e.g., to memory or to the database as described above in relation to FIGS. 2 and 3). At step 426, one or more messages may be dispatched by the intelligent script. At step 428, the call ends.

Although the example embodiment of FIG. 4 has been described in the context of handling a call received at a call center, the present disclosure is not limited to this example embodiment. Rather, the present disclosure contemplates that the example embodiment of FIG. 3 may be applied to other forms of communication, such as the multimedia communications described above in relation to FIG. 1.

Figure 5:
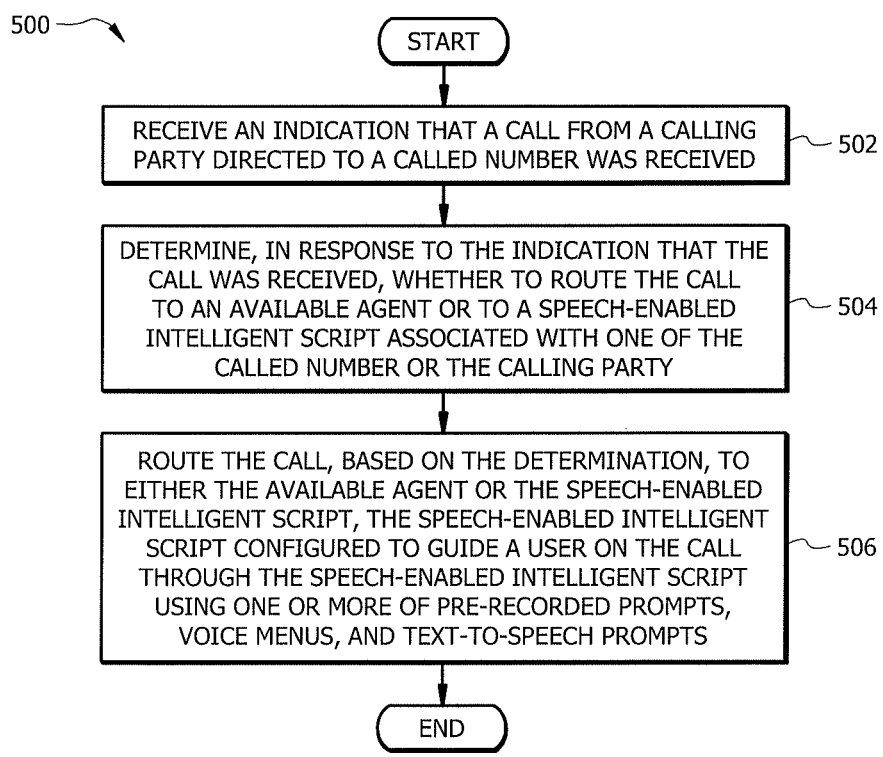
FIG. 5 is a flowchart of a method, in accordance with certain embodiments.

FIG. 5 is a flowchart of a method 500, in accordance with certain embodiments. Method 500 begins at step 502, where an indication is received that a call from a calling party directed to a called number was received.

At step 504, in response to the indication that the call was received, it is determined whether to route the call to an available agent or to a speech-enabled intelligent script associated with one of the called number or the calling party.

At step 506, the call is routed, based on the determination, to either the available agent or the speech-enabled intelligent script, the speech-enabled intelligent script configured to guide a user on the call through the speech-enabled intelligent script using one or more of pre-recorded prompts, voice menus, and text-to-speech prompts.

In certain embodiments, determining whether to route the call to the available agent or to the speech-enabled intelligent script may comprise determining whether an agent is available to answer the call. Routing the call based on the determination may comprise routing the call based on the determination of whether an agent is available to answer the call.

In certain embodiments, the method may comprise routing the call to the speech-enabled intelligent script in response to a determination that the agent is not available to answer the call. The method may comprise obtaining one or more of selections and data inputs from the user in response to the one or more of pre-recorded prompts, voice menus, and text-to-speech prompts of the speech-enabled intelligent script. The method may comprise monitoring a progress of the user through the speech-enabled intelligent script.

In certain embodiments, the method may comprise obtaining information associated with the user from a database. The method may comprise dynamically generating at least one text-to-speech prompt of the speech-enabled intelligent script based on the obtained information associated with the user. In certain embodiments, at least one of the one or more of selections and data inputs from the user may be obtained in response to the dynamically generated at least one text-to-speech prompt.

In certain embodiments, the method may comprise storing the obtained one or more selections and data inputs from the user in a database communicatively coupled to the applications server.

In certain embodiments, the method may comprise monitoring an availability of one or more agents while the user is interacting with the speech-enabled intelligent script. The method may comprise determining that an agent is now available to answer the call. The method may comprise routing the call to an agent that is now available to answer the call. The method may comprise sending the one or more of selections and data inputs obtained from the user and an indication of the progress of the user through the speech-enabled intelligent script to the agent that is now available to answer the call.

In certain embodiments, the method may comprise routing the call to the available agent in response to a determination that the agent is available to answer the call. The method may comprise determining that the user is to provide protected information. The method may comprise routing the call from the available agent to the speech-enabled intelligent script in response to a determination that the user is to provide protected information. In certain embodiments, the speech-enabled intelligent script (or a section thereof) may include prompts and/or questions similar to those in an intelligent script provided to the agent had one been available. In certain embodiments, the elements and/or actions of the speech-enabled intelligent script may be the same as the intelligent script provided to the agent. In some cases, the script prompts and/or questions may be pre-configured. In other cases, the script prompts and/or questions may change dynamically based on previous call interactions.

In certain embodiments, the method may comprise obtaining the protected information from the user in response to the one or more of pre-recorded prompts, voice menus, and text-to-speech prompts of the speech-enabled intelligent script. The method may comprise storing the obtained protected information in a database communicatively coupled to the applications server. The method may comprise routing the call from the speech-enabled intelligent script back to the available agent after obtaining the protected information. The method may comprise masking the obtained protected information such that it cannot be viewed by the available agent.

Figure 6:
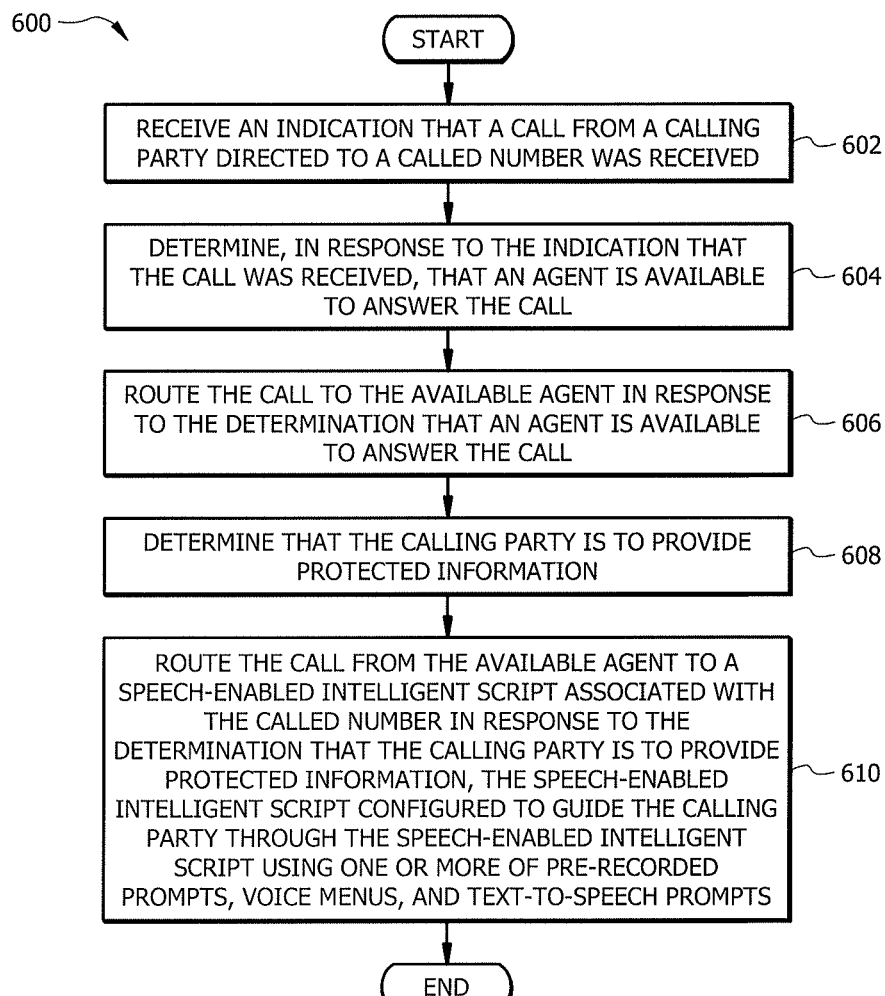
FIG. 6 is a flowchart of a method, in accordance with certain embodiments.

FIG. 6 is a flowchart of a method 600, in accordance with certain embodiments. Method 600 begins at step 602, where an indication is received that a call from a calling party directed to a called number was received.

At step 604, in response to the indication that the call was received, it is determined that an agent is available to answer the call. At step 606, the call is routed to the available agent in response to the determination that an agent is available to answer the call. At step 608, it is determined that the calling party is to provide protected information.

At step 610, the call is routed from the available agent to a speech-enabled intelligent script associated with the called number in response to the determination that the calling party is to provide protected information. The speech-enabled intelligent script is configured to guide the calling party through the speech-enabled intelligent script using one or more of pre-recorded prompts, voice menus, and text-to-speech prompts.

In certain embodiments, the method may comprise obtaining the protected information from the calling party in response to the one or more of pre-recorded prompts, voice menus, and text-to-speech prompts of the speech-enabled intelligent script. The method may comprise routing the call from the speech-enabled intelligent script associated with the called number back to the available agent after obtaining the protected information. The method may comprise masking the obtained protected information such that it cannot be viewed by the available agent.

In certain embodiments, the method may comprise storing information associated with the calling party in a database. The method may comprise dynamically generating at least one text-to-speech prompt of the speech-enabled intelligent script based on the obtained information associated with the calling party.

In certain embodiments, a computer readable storage medium, computer program, or computer program product comprises instructions which when executed on a computer perform any of the embodiments disclosed herein. In certain embodiments, the instructions are carried on a signal or carrier and are executable on a computer and when executed perform any of the embodiments disclosed herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A system, comprising:
an applications server configured to communicatively couple to a softswitch, a resource server comprising a speech-recognition engine, and a database, the applications server configured to:
 receive, from the softswitch, an indication that a call from a calling party directed to a called number was received;
 determine, in response to the indication that the call was received, whether an agent is available to answer the call;
 prior to routing the call, determine, based at least in part on the determination of whether an agent is available to answer the call, whether to route the call to an available agent determined from a plurality of agents associated with a call center or to a speech-enabled intelligent script associated with one of the called number or the calling party;
 instruct the softswitch to route the call to the speech-enabled intelligent script in response to a determination that no agent is available to answer the call, the speech-enabled intelligent script configured to guide a user on the call through the speech-enabled intelligent script using one or more of pre-recorded prompts, voice menus, and text-to-speech prompts;
 instruct the softswitch to route the call to the available agent in response to a determination that an agent is available to answer the call;
 obtain, using the speech recognition engine of the resource server, one or more of selections and data inputs from the user in response to the one or more of pre-recorded prompts, voice menus, and text-to-speech prompts of the speech-enabled intelligent script;
 monitor an availability of one or more agents while the user is interacting with the speech-enabled intelligent script;
 determine that an agent is now available to answer the call;

instruct the softswitch to transfer the call to the agent that is now available to answer the call; and send the one or more of selections and data inputs obtained from the user and an indication of the progress of the user through the speech-enabled intelligent script to the agent that is now available to answer the call.

2. The system of claim 1, wherein the applications server is configured to:

monitor a progress of the user through the speech-enabled intelligent script.

3. The system of claim 2, wherein the applications server is configured to:

obtain information associated with the user from the database;

dynamically generate at least one text-to-speech prompt of the speech-enabled intelligent script based on the obtained information associated with the user; and obtain at least one of the one or more of selections and data inputs from the user in response to the dynamically generated at least one text-to-speech prompt.

4. The system of claim 2, wherein the applications server is configured to store the obtained one or more selections and data inputs from the user in the database.

5. The system of claim 1, wherein:

the applications server is configured to communicatively couple to a graphical user interface; and the applications server is configured to display, on the graphical user interface, a visual representation of the speech-enabled intelligent script and an indication of the progress of the user through the speech enabled script.

6. The system of claim 5, wherein the applications server is configured to:

determine, based on the one or more selections and data inputs obtained from the user, a measurement of user satisfaction; and display, on the graphical user interface, a visual indication of the measurement of user satisfaction.

7. The system of claim 1, wherein the applications server is configured to:

determine that the user is to provide protected information; and instruct the softswitch to route the call from the available agent to the speech-enabled intelligent script in response to the determination that the user is to provide protected information.

8. The system of claim 7, wherein the applications server is configured to:

obtain the protected information from the user in response to the one or more of pre-recorded prompts, voice menus, and text-to-speech prompts of the speech-enabled intelligent script;

store the obtained protected information in the database;

mask the obtained protected information such that it cannot be viewed by the available agent; and instruct the softswitch to route the call from the speech-enabled intelligent script back to the available agent after obtaining the protected information.

9. The system of claim 1, wherein the applications server is configured to:

determine whether to route the call to the available agent or to the speech-enabled intelligent script also based on information associated with one or more previous calls made by the user.

10. A method, comprising:

receiving an indication that a call from a calling party directed to a called number was received;

determining, in response to the indication that the call was received, whether an agent is available to answer the call;

prior to routing the call, determine, based at least in part on the determination of whether an agent is available to answer the call, whether to route the call to an available agent determined from a plurality of agents associated with a call center or to a speech-enabled intelligent script associated with one of the called number or the calling party; and routing the call, based on the determination of whether to route the call to an available agent or to a speech-enabled intelligent script, to either the available agent or the speech-enabled intelligent script, the speech-enabled intelligent script configured to guide a user on the call through the speech-enabled intelligent script using one or more of pre-recorded prompts, voice menus, and text-to-speech prompts.

11. The method of claim 10, comprising:

routing the call to the speech-enabled intelligent script in response to a determination that no agent is available to answer the call;

obtaining one or more of selections and data inputs from the user in response to the one or more of pre-recorded prompts, voice menus, and text-to-speech prompts of the speech-enabled intelligent script; and monitoring a progress of the user through the speech-enabled intelligent script.

12. The method of claim 11, further comprising:

obtaining information associated with the user from a database;

dynamically generating at least one text-to-speech prompt of the speech-enabled intelligent script based on the obtained information associated with the user; and wherein at least one of the one or more of selections and data inputs from the user are obtained in response to the dynamically generated at least one text-to-speech prompt.

13. The method of claim 11, further comprising storing the obtained one or more selections and data inputs from the user in a database communicatively coupled to the applications server.

14. The method of claim 11, comprising:

monitoring an availability of one or more agents while the user is interacting with the speech-enabled intelligent script;

determining that an agent is now available to answer the call;

routing the call to an agent that is now available to answer the call; and sending the one or more of selections and data inputs obtained from the user and an indication of the progress of the user through the speech-enabled intelligent script to the agent that is now available to answer the call.

15. The method of claim 10, comprising:

routing the call to the available agent in response to a determination that the agent is available to answer the call;

determining that the user is to provide protected information; and routing the call from the available agent to the speech-enabled intelligent script in response to a determination that the user is to provide protected information.

16. The method of claim 15, comprising:
obtaining the protected information from the user in response to the one or more of pre-recorded prompts, voice menus, and text-to-speech prompts of the speech-enabled intelligent script;
storing the obtained protected information in a database communicatively coupled to the applications server;
routing the call from the speech-enabled intelligent script back to the available agent after obtaining the protected information; and
masking the obtained protected information such that it cannot be viewed by the available agent.

17. A method, comprising:
receiving an indication that a call from a calling party directed to a called number was received;
determining, in response to the indication that the call was received, whether an agent is available to answer the call;
prior to routing the call, determine, based at least in part on the determination of whether an agent is available to answer the call, whether to route the call to an available agent determined from a plurality of agents associated with a call center or to a speech-enabled intelligent script associated with the called number;
in response to determining that an agent is available to answer the call, routing the call to the available agents;
determining that the calling party is to provide protected information; and
routing the call from the available agent to the speech-enabled intelligent script associated with the called number in response to the determination that the calling party is to provide protected information, the speech-enabled intelligent script configured to guide the calling party through the speech-enabled intelligent script using one or more of pre-recorded prompts, voice menus, and text-to-speech prompts.

18. The method of claim 17, comprising:
obtaining the protected information from the calling party in response to the one or more of pre-recorded prompts, voice menus, and text-to-speech prompts of the speech-enabled intelligent script;
routing the call from the speech-enabled intelligent script associated with the called number back to the available agent after obtaining the protected information; and
masking the obtained protected information such that it cannot be viewed by the available agent.

19. The method of claim 17, further comprising:
storing information associated with the calling party in a database; and
dynamically generating at least one text-to-speech prompt of the speech-enabled intelligent script based on the obtained information associated with the calling party.

\* \* \* \* \*